(12) United States Patent
White et al.

(10) Patent No.: US 11,181,759 B2
(45) Date of Patent: Nov. 23, 2021

(54) METHODS OF IMPROVING THE RETARDATION ACCURACY AND STABILITY OF PHOTOELASTIC MODULATOR DEVICES

(71) Applicant: Applied Photophysics Inc., Beverly, MA (US)

(72) Inventors: Nigel Thornton Hopley White, Dorking (GB); Lindsay John Cole, Bookham (GB)

(73) Assignee: Applied Photophysics Limited, Leatherhead (GB)

( * ) Notice: Subject to any disclaimer, the term of this patent is extended or adjusted under 35 U.S.C. 154(b) by 0 days.

(21) Appl. No.: 16/100,558

(22) Filed: Aug. 10, 2018

(65) Prior Publication Data
US 2019/0243166 A1    Aug. 8, 2019

Related U.S. Application Data

(63) Continuation of application No. PCT/US2017/017111, filed on Feb. 9, 2017.
(Continued)

(51) Int. Cl.
*G02B 26/00* (2006.01)
*G02F 1/01* (2006.01)

(52) U.S. Cl.
CPC .................. *G02F 1/0131* (2013.01)

(58) Field of Classification Search
CPC ....... G02F 1/0131; G01J 3/447; G01J 3/0229; G01N 21/19; G01N 21/21; G01N 21/211; G01N 21/6445; G01N 2021/213
(Continued)

(56) References Cited

U.S. PATENT DOCUMENTS

| 3,540,827 A | 11/1970 | Badoz et al. |
| 4,003,663 A | 1/1977 | Steinberg |

(Continued)

OTHER PUBLICATIONS

Nafie, L., Dual Polarization Modulation: A Real-Time, Spectral-Multiplex Separation of Circular Dichroism from Linear Birefringence Spectral Intensities, Applied Spectroscopy, vol. 54, Issue 11, pp. 1634-1645 (Year: 2000).*

(Continued)

*Primary Examiner* — Mahidere S Sahle
(74) *Attorney, Agent, or Firm* — McCarter & English, LLP; Jonathan M. Sparks; Alexandra J. Jones

(57) ABSTRACT

The present invention relates to methods for calibrating and controlling a polarization modulator, for example a photoelastic modulator (PEM) device on a CD measurement instrument, the method comprising scanning the control input voltage ($V_{in}$) at a fixed wavelength ($\lambda_{meas}$); and recording the CD scan, wherein the control input voltage ($V_{in}$) determines the peak retardation ($\delta$) at the fixed wavelength ($\lambda_{meas}$), and wherein the method is repeated for one or more fixed wavelengths. An augmented drive function allows the PEM to be operated with greater accuracy over the full wavelength range, and measurement of resonant frequency provides a means to continually correct for temperature related drift of retardation.

20 Claims, 26 Drawing Sheets

Related U.S. Application Data

(60) Provisional application No. 62/293,514, filed on Feb. 10, 2016.

(58) Field of Classification Search
USPC ........ 356/365, 368, 451, 453; 359/246, 291, 359/489.07
See application file for complete search history.

(56) References Cited

U.S. PATENT DOCUMENTS

| | | | |
|---|---|---|---|
| 6,025,913 A | | 2/2000 | Curbelo |
| 6,134,011 A | * | 10/2000 | Klein ..................... G01J 4/04 250/225 |
| 6,831,743 B2 | | 12/2004 | Aspnes et al. |
| 10,352,846 B2 | * | 7/2019 | White ................... G01N 21/19 |

OTHER PUBLICATIONS

Schippers, P. H., Dekkers, H. P. J. M., Direct determination of absolute circular dichroism data and calibration of commercial instruments, Analytical Chemistry, vol. 53, No. 6, pp. 778-782 (Year: 1981).*

Jellison, G. E., Modine, F. A, Accurate Calibration Of A Photo-Elastic Modulator In Polarization Modulation Ellipsometry, Polarization Considerations for Optical Systems II, vol. 1166, pp. 231-241 (Year: 1989).*

Breeze et al., A circular dichroism spectrophotometer using an elasto-optic modulator. Anal Biochem. Nov. 1972;50 (1):281-303.

Drake, Polarisation modulation—the measurement of linear and circular dichroism. J Phys E: Sci Instrum. 1986;19:170-181.

International Search Report and Written Opinion for Application No. PCT/US2017/017111, dated Apr. 19, 2017, 9 pages.

* cited by examiner

METHODS OF IMPROVING THE RETARDATION ACCURACY AND STABILITY OF PHOTOELASTIC MODULATOR DEVICES

RELATED APPLICATIONS

This application is a continuation of International Patent Application No. PCT/US2017/017111, filed on Feb. 9, 2017, which claims the benefit of priority to U.S. Provisional Patent Application No. 62/293,514, filed on Feb. 10, 2016, the entire contents of which are hereby incorporated herein by reference.

BACKGROUND OF THE INVENTION

A photoelastic modulator (PEM) is an optical device used to modulate the polarization of a light source. A PEM consists of a transparent isotropic material (e.g. fused silica) mechanically coupled to a piezoelectric block. The PEM can be used to oscillate between different polarization states of light. When a voltage is applied to the piezoelectric, the stress induced is transferred to the crystal, creating a phase difference, $\delta$, between the electric field vectors parallel and perpendicular to the stress axis of the PEM. Depending on the voltage applied, the light can be circularly polarized, linearly polarized, or elliptically polarized. In circular dichroism (CD) and linear dichroism (LD) spectroscopy, a PEM is used to oscillate between left- and right-circularly polarized light and vertically and horizontally polarized light, respectively. The object of a PEM calibration is to determine the relationship between control input voltage Vin and peak retardation ($\delta$) over the full wavelength range of interest. For PEMs comprising a fused silica optical element, this range is approximately 170 nm to 2000 nm. The accuracy of the calibration directly impacts on the accuracy of measurements performed with the PEM, hence a method which can provide high accuracy at all wavelengths is highly desirable.

SUMMARY OF THE INVENTION

The present invention is based on the discovery of a novel and inventive method for calibrating a system comprising a photoelastic modulator (PEM) and an optical measurement instrument, wherein the optical measurement instrument is selected from the group consisting of a Circular dichroism (CD) measurement instrument, a linear dichroism (LD) measurement instrument, an optical rotatory dispersion (ORD) measurement instrument, a fluorescence polarisation (FP) measurement instrument, a circularly polarised luminescence (CPL) measurement instrument, an ellipsometry measurement instrument, a birefringence measurement instrument, a Stokes polarimetry measurement instrument and Mueller matrix polarimetry measurement instrument.

Accordingly, in certain aspects, the present invention is based, in part, on the discovery of a method, and an associated calibration system, comprising a photoelastic modulator (PEM) on a circular dichroism (CD) measurement instrument, that provides high calibration accuracy by fully exploiting all the points in a CD vs. Vin trace, in contrast to methods known in the art which only exploit a single point of this or similar traces. The parameter results determined at all wavelengths measured can then be combined by fitting to an appropriate PEM drive function which then allows accurate PEM retardation control at all wavelengths covered by the instrument. Further, in instruments utilizing a PEM, for example a CD spectrometer, an important consideration for the stability and accuracy of measurements performed is that the PEM produces a consistent retardation with minimal temporal and temperature dependent drift. PEM driver electronics have been developed by the present inventors which allow the resonance frequency to be precisely measured in real time, thus allowing the utilization of the PEM frequency as part of a retardation correction scheme, which is a novel and non-obvious approach to the problem Accordingly, the present invention features methods for calibrating a photoelastic modulator. It is well understood by one skilled in the art that PEMs can be used in a multitude of instruments. The calibration described herein is performed on a CD instrument, but the resulting calibration is not restricted to CD measurements.

In a first aspect, the present invention features a method for calibrating a photoelastic modulator using a circular dichroism (CD) measurement instrument, the method comprising scanning the control input voltage ($V_{in}$) at a fixed wavelength ($\lambda_{meas}$); and recording the CD scan, wherein the control input voltage ($V_{in}$) determines the peak retardation ($\delta$) at the fixed wavelength ($\lambda_{meas}$), and wherein the method is repeated for one or more fixed wavelengths.

In one embodiment, the methods further comprises the step of fitting the results measured at each wavelength to a drive function (F).

In a further embodiment, the drive function is an augmented drive function. In another embodiment, the drive function provides accurate retardation control at each wavelength.

In one embodiment, the augmented drive function is characterized by the equation:

$$V_{in} = (c + m\lambda + n\lambda^{-1}) \cdot \frac{2}{\pi} \cdot \Phi$$

In a related embodiment, the CD measurement error for the augmented drive is less than 0.01%, less than 0.009%, less than 0.008%, less than 0.007%, less than 0.006%, less than 0.005%, less than 0.004%, less than 0.003%, less than 0.002%, less than 0.001%.

In one embodiment, the fixed wavelength is from about 170 nm to about 2000 nm. In a further embodiment, the fixed wavelength is selected from one or more wavelengths listed in Table 1

TABLE 1

| Peak No. | Peak Wavelength (nm) |
|---|---|
| 1 | 175.29 |
| 2 | 184.26 |
| 3 | 194.26 |
| 4 | 205.64 |
| 5 | 218.79 |
| 6 | 234.24 |
| 7 | 252.72 |
| 8 | 275.25 |
| 9 | 303.30 |
| 10 | 339.15 |
| 11 | 386.46 |
| 12 | 451.54 |
| 13 | 546.20 |
| 14 | 695.61 |
| 15 | 964.10 |
| 16 | 1577.53 |

In still another embodiment, the fixed wavelength is selected from at least four wavelengths in Table 1. In a further embodiment, the fixed wavelength is selected from at least eight wavelengths in Table 1. In another further embodiment, the fixed wavelength is selected from 1, 2, 3, 4, 5, 6, 7, 8, 9, 10, 11, 12, 13, 14, 15 or 16 wavelengths in Table 1. In one embodiment, the at least four wavelengths comprise peak numbers 2, 6, 10 and 14. In another embodiment, the at least eight wavelength comprise peak numbers 2, 4, 6, 8, 10, 12, 14 and 16.

In one embodiment, the method comprises performing an initial calibration of the system before a refined calibration measurement begins.

In one embodiment, the sample is circular dichroism (CD) sample. In a related embodiment, the CD sample provides large CD signals across the full wavelength range of the instrument. In certain exemplary embodiments, the CD sample is a DichOS optical standard, as described in International Application No. PCT/US2015/054151, incorporated by reference in its entirety herein.

In one embodiment, the control voltage input is from 0V to 5V.

In one embodiment, the conditions for recording the scans comprise a) a bandwidth of 1-8 nm, for example 1, 2, 3, 4, 5, 6, 7 or 8 nm; b) a time point of 0.1-5 seconds, for example 0.1, 0.5, 1.0, 1.5, 2.0, 2.5, 3.0, 3.5, 4.0, 4.5 or 5 seconds; and c) 50-500 points (M), for example 50, 100, 150, 200, 250, 300, 350, 400, 450 or 500 points (M), preferably 100-200 points (M).

Ranges provided herein are understood to be shorthand for all of the values within the range. In an exemplary embodiment, the conditions for recording the scans comprise a) a bandwidth of 1 nm; b) a time point of 0.25 seconds; and c) 200 points (M).

In one embodiment, the method is automated.

In one embodiment, the method further comprises a drive correction to account for temperature shifts, wherein the drive correction is characterized by the equation: v $$Dcorr = \frac{V_{rate}}{V_{ratenom}},$$

wherein, $V_{rate}$, corresponds to the actual volts per radian of retardation at the V-scan wavelength $V_{ratenom}$, corresponds to a nominal value for this parameter, and Dcorr is a function of the PEM resonance frequency shift ($\Delta f$). In certain embodiments, the relationship between Dcorr and PEM frequency shift ($\Delta f$) is linear.

In a further embodiment, the PEM control voltage $V_{in}$ is scaled by the drive correction to give a corrected control voltage $V_{in\_corr}$. characterized by the equation:

$V_{in\_corr} = V_{in} \cdot Dcorr.$

In one embodiment, the system transmits light through the sample to measure its optical properties and the system includes a sample stage that carries the sample and has an aperture through which light is transmitted for each calibration of the system.

In one embodiment, the system reflects light from the sample to measure its optical properties and the system includes a sample stage that carries the sample and also carries a mirror from which light is reflected for each calibration of the system.

In another aspect, the method of any one of the aspects and embodiments described herein further comprises a temperature control system. In one embodiment, the temperature control system is used to stabilize the temperature of the PEM core. In another embodiment, a measurement of frequency is used as a probe for the temperature control system. In a related embodiment, the measurement of frequency is the frequency after calibration. In another embodiment, the temperature control system is a proportional integral derivative (PID) control system. In another further embodiment, a measurement of frequency is used as a controlled measured variable for input to a proportional integral derivative (PID) control loop. In a related embodiment, the PID control loop drives heating or cooling of the PEM core environment, thereby controlling the temperature of the PEM core. In another embodiment of any of the aspects and embodiments described herein, the method further comprises a feed forward system that heats and cools the PEM environment. In a further embodiment, the feedforward system uses the $V_{rate}$ from a long term averaged retardation to set the feedforward level.

In one embodiment of any of the aspects and embodiments described herein the method further comprises a measuring step. In a further embodiment, the measuring step comprises collecting data to monitor an input or an output. In a related embodiment, the data is collected using a computer program product.

In another aspect, the present invention features a calibration system comprising a photoelastic modulator (PEM) on a circular dichroism (CD) measurement instrument, and a device or program for collecting data. In one embodiment, the data is collected using a computer program product. In another embodiment, the calibration system is configured to for calibrating a photoelastic modulator on a circular dichroism (CD) measurement instrument, comprising a mechanism for scanning the control input voltage ($V_{in}$) at a fixed wavelength ($\lambda_{meas}$); and an analyzer for recording the CD scan, wherein the control input voltage ($V_{in}$) determines the peak retardation ($\delta$) at the fixed wavelength ($\lambda_{meas}$).

Another aspect of the present invention includes a computer program product that can be used with the methods and systems of the present invention.

The present invention is described in further detail by the figures and examples below, which are used only for illustration purposes and are not limiting.

DETAILED DESCRIPTION OF THE INVENTION

Figure 1:
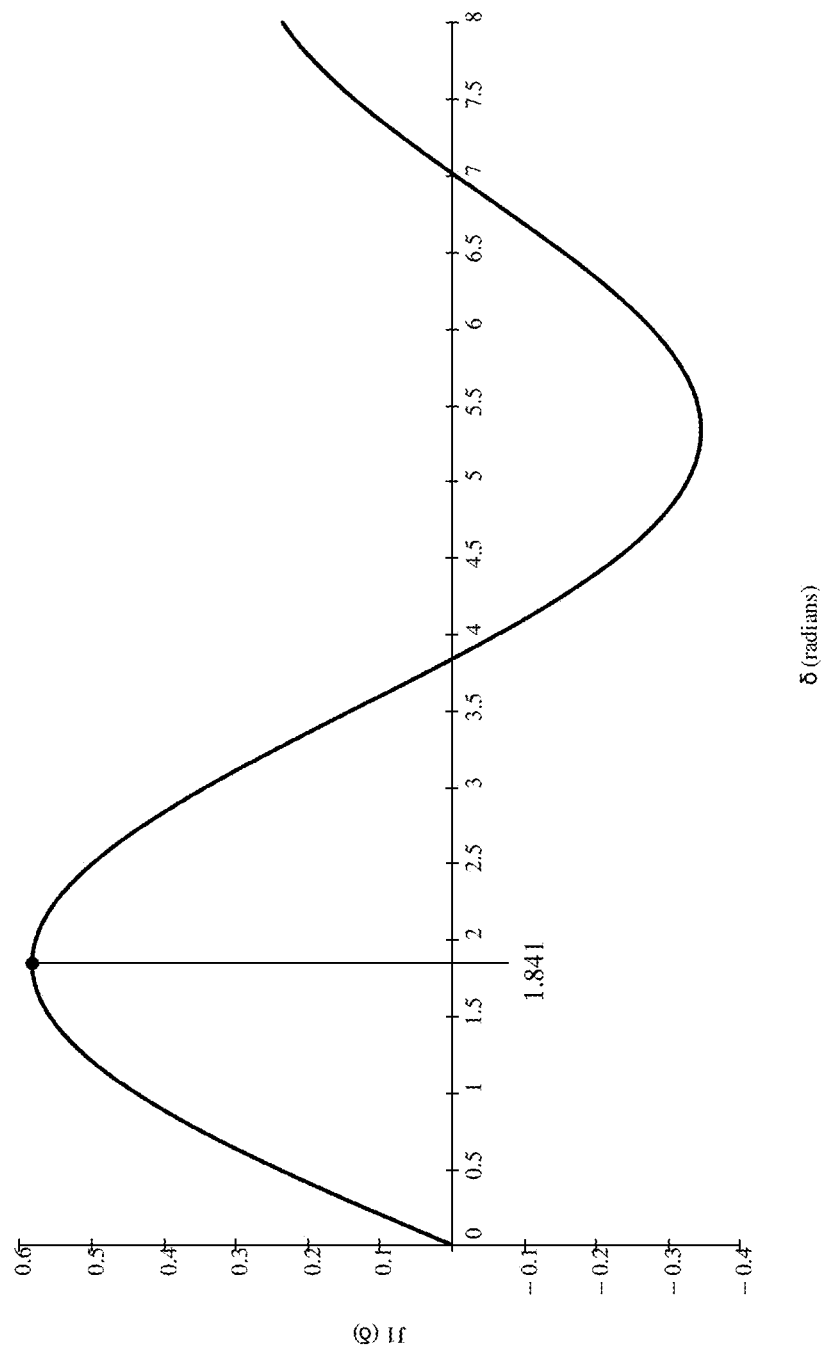
FIG. 1 shows the J1 Bessel Function with first maximum and first zero indicated.

As described in the present invention, an accurate PEM calibration performed at multiple wavelengths from the visible ultra violet (VUV) into the near infrared (NIR), clearly demonstrates that using a linear drive function does not provide accurate retardation control at all wavelengths, with a deviation from linearity particularly evident in the UV region (below 400 nm). This has not been observed before, likely due to the lack of a suitably accurate and sensitive calibration method, and the lack of a test sample providing large CD amplitudes across the wavelength range. "CD V-scans" refer to CD measurements obtained by scanning the PEM control input voltage (Vin) at a fixed wavelength. The present invention solves the problem of accurate PEM calibration, by utilizing all the points in the V-scan instead of just the zero position, thereby achieving much greater accuracy and robustness.

In certain embodiments, the methods of the present invention are preferably performed with a DichOS standard, as described in International Application No. PCT/US2015/054151, incorporated by reference in its entirety herein. When performed using the DichOS optical standard, the V-scan method allows PEMs to be calibrated with greater accuracy and down to a lower wavelength (170 nm) than was previously possible. The methods described herein are also applicable to detection modes other than CD, such as optical rotation, requiring only simple modification, as described in the examples below.

Definitions

The articles "a," "an," and "the" are used herein to refer to one or to more than one (i.e. to at least one) of the grammatical object of the article unless otherwise clearly indicated by contrast. By way of example, "an element" means one element or more than one element.

The term "including" is used herein to mean, and is used interchangeably with, the phrase "including but not limited to."

The term "or" is used herein to mean, and is used interchangeably with, the term "and/or," unless context clearly indicates otherwise.

The term "such as" is used herein to mean, and is used interchangeably, with the phrase "such as but not limited to."

The term "photoelastic modulator (PEM)" is meant to refer to an optical device that is used to modulate the polarization of a light source at a fixed frequency. Various formats of PEMs are available. A "rectangular format PEM" uses a rectangular shape for the modulator optical element. An "octagonal format PEM" uses an octagonal shape for the modulator optical element, which results in higher retardations for a given drive voltage, and therefore tends to work further into the infrared part of the spectrum. Rectangular and octagonal PEMs are commercially available to the public.

The term "circular dichroism" (CD) as used herein is meant to refer to the difference in the absorption of left-handed circularly polarized light (L-CPL) and right-handed circularly polarized light (R-CPL) and occurs when a molecule contains one or more chiral chromophores (light-absorbing groups).

The term "linear dichroism" (LD) as used herein is meant to refer to a spectroscopic technique that can be used with systems that are either intrinsically oriented, or can be oriented during an experiment by external forces. To measure LD the sample is oriented, then the difference in absorption of light linearly polarized parallel and perpendicular to the orientation axis is measured.

A "sample" as used herein is meant to refer to any CD sample or set of CD samples. In certain embodiments, a preferred sample is one that provides large CD signals across the full wavelength range of the instrument. In exemplary embodiments, the CD sample is an optical CD calibration standard, 'DichOS', described in International Application No. PCT/US2015/054151, and incorporated by reference in its entirety herein.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about.

Any devices or methods provided herein can be combined with one or more of any of the other devices and methods provided herein.

Ranges provided herein are understood to be shorthand for all of the values within the range. For example, a range of 1 to 50 is understood to include any number, combination of numbers, or sub-range including non-integer values from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Reference will now be made in detail to preferred embodiments of the invention. While the invention will be described in conjunction with the preferred embodiments, it will be understood that it is not intended to limit the invention to those preferred embodiments. To the contrary, it is intended to cover alternatives, modifications, and equivalents as may be included within the spirit and scope of the invention as defined by the appended claims.

Photoelastic Modulators

Birefringence is a difference in refractive index that occurs along different axes in a material. Birefringence means that different linear polarizations of light travel at different speeds through the material. These different polarizations are most often considered as two components of the polarized light, one being orthogonal to the other. Birefringence is an intrinsic property of many optical materials, and may also be induced by external forces. Retardation or retardance represents the integrated effect of birefringence acting along the path of a light beam traversing the sample. If the incident light beam is linearly polarized, two orthogonal components of the polarized light will exit the sample with a phase difference, called the retardance ($\delta$).

A photoelastic modulator (PEM) is an optical device used to modulate the polarization of a light source. The photoelastic effect is used to change the birefringence of the optical element in the photoelastic modulator. A PEM offers a very sensitive method of measuring low levels of retardation arising from stress in an optical material sample. The basic design of a photoelastic modulator consists of a piezoelectric transducer and a half wave resonant bar; the bar being a transparent material (now most commonly fused silica). In more detail, a piezoelectric actuator induces birefringence in an isotropic material by uniaxial strain, therefore, the velocity of the light is different for the polarization parallel and perpendicular to the optical axis. The phase shift that occurs between the two orthogonal polarization states can be modulated by changing the strain via an oscillating electric field. A number of fused silica and CaF2, LiF, ZnSe, Si, etc. photoelastic modulators are commercially available and suitable for use in the claimed methods.

Exemplary birefringence measurement systems are described in U.S. Pat. No. 6,985,227, hereby incorporated by reference.

The principle of operation of photoelastic modulators is based on the photoelastic effect, in which a mechanically stressed sample exhibits birefringence proportional to the resulting strain. Photoelastic modulators are resonant devices where the precise oscillation frequency is determined by the properties of the optical element/transducer assembly. The transducer is tuned to the resonance frequency of the optical element along its long dimension, determined by its length and the speed of sound in the material. A current is then sent through the transducer to vibrate the optical element through stretching and compressing which changes the birefringence of the transparent material.

The object of a PEM calibration is to determine the relationship between control input voltage $V_{in}$ and peak retardation ($\delta$) over the full wavelength range of interest. The accuracy of the calibration directly impacts on the accuracy of measurements performed with the PEM, hence a method which can provide high accuracy at all wavelengths is highly desirable.

A conventional circular dichroism (CD) spectrometer, for example, incorporates a photoelastic modulator, with other components, such as a lens and detector. Accordingly, the present invention describes, in part, a method for individual calibration of photoelastic modulators (PEMs) in-situ on CD instruments.

It is understood that the methods as described herein are not limited to being performed on a CD instrument, but can also apply to other optical measurement systems.

Calibration System

The photoelastic modulators as described herein are used in certain aspects of the present invention in a calibration system. The calibration system comprises a photoelastic modulator on an optical detection measurement instrument, and a device or program for collecting data. The optical measurement instrument can be, for example, a circular dichroism (CD) measurement instrument, a linear dichroism (LD) measurement instrument, an optical rotatory dispersion (ORD) measurement instrument, a fluorescence polarisation (FP) measurement instrument, a circularly polarised luminescence (CPL) measurement instrument, an ellipsometry measurement instrument, a birefringence measurement instrument, a Stokes polarimetry measurement instrument and Mueller matrix polarimetry measurement instrument. In certain aspects, the calibration system comprises a photoelastic modulator on a circular dichroism (CD) measurement instrument, and a device or program for collecting data.

Methods for Calibrating a PEM Device

The present invention features methods for calibrating a photoelastic modulator (PEM). According to aspects of the invention, the method comprises scanning the control input voltage ($V_{in}$) at a fixed wavelength ($\lambda_{means}$); and recording the scan, wherein the control input voltage ($V_{in}$) determines the peak retardation ($\delta$) at the fixed wavelength ($\lambda_{means}$), and wherein the method is repeated for one or more fixed wavelengths.

In embodiments of the invention, the method further comprises the step of fitting the results measured at each wavelength to a drive function ($\delta$). In preferred embodiments of the invention, the drive function is an augmented drive function, as described herein below.

In a preferred embodiment the data collected from the scans of a sample are stored in a data file and displayed on a computer display for analysis. It will be appreciated that any of a number of variations for displaying the measured data will suffice.

The object of a PEM calibration is to determine the relationship between control input voltage $V_{in}$ and peak retardation ($\delta$) over the full wavelength range of interest. According to preferred embodiments of the present invention, the fixed wavelength is from about 170 nm to about 2000 nm.

In certain exemplary embodiments, an initial calibration of the system is performed before a refined calibration begins.

As described herein, in preferred embodiments of the invention, the polarisation modulator is a photoelastic modulator (PEM) device. PEM devices are known in the art and are commercially available to the public. In certain embodiments of the invention, the sample is a circular dichroism (CD) sample. CD calibration is required to ensure that measured CD spectra have the correct magnitude. Various factors affect measured CD magnitude, including optical imperfections in the instrument, detector non-linearity, detector polarization bias response, gains (AC and DC) in the electronic detection chain and photoelastic modulator (PEM) calibration.

In preferred exemplary embodiments, the CD sample provides large CD signals across the full wavelength range of the instrument. Recently, an optical CD calibration standard called 'DichOS' has been developed (International Application No. PCT/US2015/054151, incorporated by reference in its entirety herein) which fits these requirements extremely well. Accordingly, in preferred embodiments, the DichOS standard is used for the V-scan calibration.

The optical retardation generated by a photoelastic modulator (PEM) is governed by the control voltage input Vin. In certain preferred embodiments, the control voltage input is from 0V to 10V, e.g. 1, 2, 3, 4, 5, 6, 7, 8, 9 or 10 V, preferably 0V to 5V, e.g. 1, 2, 3, 4, or 5V.

The methods described herein may also be applied for an instrument measuring optical rotation. In this instance, the predicted curve shape is based on the J2 Bessel function, and the resulting V-scan fitting requirements are as detailed herein below.

The methods of the present invention may also be applied to an automated method.

Computer Program Product

As will be appreciated by one of skill in the art, the invention may be embodied as a method, system, or computer program product. Accordingly, embodiments of the present invention include methods, systems, software and embodiments combining any of the methods, systems and software. Aspects of the present invention may be performed in the firmware of the control electronics or on a host PC monitoring the system. For example, systems of the invention as described herein may be setup for prototyping with a PC program to monitor the control electronics and to control an output via a separate variable output powersupply. In other embodiments, this functionality would be incorporated into firmware of the control electronics with variable voltage output stage incorporated into the control electronics (as all the information used is extracted by the PC program from there already). As such the PC software is just emulating what would be done for production.

Furthermore, aspects of the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

It will be understood that the various methods described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the methods described herein.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the methods described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the methods described herein.

Applications

While not limiting, some of the applications in which the PEM may form an integral part of the instrumentation include Circular dichroism (CD), linear dichroism (LD), optical rotatory dispersion (ORD), fluorescence polarisation (FP), circularly polarised luminescence (CPL), ellipsometry, birefringence measurement, Stokes polarimetry and Mueller matrix polarimetry. The present invention provides a benefit to all of these techniques in enabling a greater measurement accuracy to be achieved.

The invention is illustrated by the following Examples, which are not intended to be limiting in any way.

EXAMPLES

Example 1. V-Scan PEM Calibration

The present invention describes, in part, a method for individual calibration of photoelastic modulators (PEMs) in-situ on circular dichroism (CD) instruments. The method is based on the fitting of modified Bessel functions to 'CD V-scans', which refer to CD measurements obtained by scanning the PEM control input voltage ($V_{in}$) at a fixed wavelength. The parameters of the fits then provide accurate relationships between PEM driver voltage and retardation at each wavelength studied. The parameter results determined at all wavelengths measured can then be combined by fitting to an appropriate PEM drive function which then allows accurate PEM retardation control at all wavelengths covered by the instrument. This aspect of the calibration is covered in Example 2.

The object of a PEM calibration is to determine the relationship between control input voltage ($V_{in}$) and peak retardation ($\delta$) over the full wavelength range of interest. For PEMs comprising a fused silica optical element, this range is approximately 170 nm to 2000 nm. The accuracy of the calibration directly impacts on the accuracy of measurements performed with the PEM, hence a method which can provide high accuracy at all wavelengths is highly desirable. The method described here provides high calibration accuracy by fully exploiting all the points in a CD vs. $V_{in}$ trace, in contrast to methods known in the art which only exploit a single point of this or similar traces (usually a zero crossing).

The photoelastic modulator (PEM) used in the examples described herein comprises a fused silica optical element bonded to a quartz transducer. As discussed supra, a PEM can be in a "rectangular format PEM" and "octagonal format PEM." The present invention is not to be limited to one type of format, rather, similar if not identical results are expected when either format is used. A standard linear drive equation exists for relating the control input voltage ($V_{in}$) to the required peak retardation ($\delta$)

$$V_{in} = (-0.163 + 0.00273\lambda) \cdot \frac{2\delta}{\pi} \quad (1)$$

Where $\delta$ is in radians and $\lambda$ in nm. This equation may also be rearranged for retardation $\delta$ as follows:

$$\delta = \frac{\pi \cdot V_{in}}{2(-0.162 + 0.00273\lambda)} \quad (2)$$

Equation (1) asserts that, for a fixed retardation $\delta$, the control voltage ($V_{in}$) is linear with respect to wavelength $\lambda$. Equation (2) asserts that, at a fixed wavelength $\lambda$, the retardation $\delta$
is linear with respect to control voltage ($V_{in}$). The calibration method described below will allow the validity of these assertions to be tested.

V-Scan Theory

In this section, the present inventors investigated the type of curve shape which results from measuring CD ($\theta$) whilst scanning the PEM control voltage ($V_{in}$) at a fixed wavelength ($\lambda$), and how such a measurement can be used to determine the relationship between $V_{in}$ and PEM retardation ($\delta$) at the wavelength in question. We refer to these voltage scanned measurements as 'CD V-scans', or simply 'V-scans'.

CD Dependence on PEM Retardation

In a CD instrument, monochromatic, linear polarised light is passed through a PEM, which induces a periodic modulation of the polarisation between left-circular and right-circular states. If this light is then passed through a sample exhibiting circular dichroism, a corresponding modulation of AC signal amplitude ($V_{AC}$) will be observed at the detector superimposed on the DC level ($V_{DC}$). The CD measurement is then determined simply from the ratio of the AC and DC signal voltages, scaled by a suitable calibration factor to render the result in the required units (usually millidegrees):

$$\theta_{meas} = cal \cdot \frac{V_{AC}}{V_{DC}} \quad (3)$$

By analysing the optical system and detection circuit, the following relationship for $V_{AC}/V_{DC}$ may be derived:

$$\frac{V_{AC}}{V_{DC}} = G \cdot \sin(2\theta_p) \cdot 1(\delta) \cdot \frac{\Delta T}{T} \quad (4)$$

Where:
G is the ratio of gains in the AC and DC channels ($G_{AC}/G_{DC}$)
$\theta_p$ is the angle between the linear input polarisation vector and the PEM stress axis. This is normally set to 450 for maximal signal amplitude, making the sin factor above equal to unity.
$\delta$ is the PEM retardation in radians.
$\Delta T$ and T are respectively the differential and mean sample transmittances for left-circular and right-circular polarised light: ($\Delta T = T_L - T_g$), ($T = T_L + T_g/2$)
J1 is the first order Bessel function of the first kind, as depicted in FIG. 1.

It is well known that $\Delta T/T$ can be used to approximate small absorption differences. In the case of CD, the exact relationship is given by:

$$\theta_{true} = -\frac{180}{4\pi} \cdot \frac{\Delta T}{T} = 14323.9 \cdot \frac{\Delta T}{T} \quad (5)$$

Where $\theta_{true}$ is measured in millidegrees. Since CD measurements are generally very small when measured on an absorbance scale, the above approximation is found to be very accurate.
Combining Equations (3), (4) and (5), we arrive at:

$$\theta_{meas}(\delta) = \frac{cal \cdot G \cdot \sin(2\theta_p) \cdot \theta_{true}}{14323.9}. \quad (6)$$

Which describes how the measured CD signal varies with PEM retardation S. Referring to FIG. 1, we observe that the first maximum of $J1(\delta)$ occurs when $\delta = 1.841$ radians (105 degrees). So defining $\theta_{max} = 1.841$ rads, we may write:

$$\frac{\theta_{max}}{\sin(\delta_{max})} = \frac{cal \cdot G \cdot \sin(2\theta_p) \cdot \theta_{true}}{14323.9}. \quad (7)$$

Substituting this into equation (6), we finally arrive at:

$$\theta_{meas}(\delta) = \theta_{max} \cdot \frac{J1(\delta)}{J1(\delta)_{max}} = \theta_{max} \cdot \frac{J1(\delta)}{0.581865} \quad (8)$$

This equation shows that varying the PEM retardation at a fixed wavelength will cause the measured CD signal to follow a J1 Bessel function, scaled so to give a maximum of $\theta_{max}$ at $\delta = 1.841$ radians. If the instrument is correctly calibrated at a retardation of $\delta_{max}$ for the wavelength measured, then $\theta_{max}$ will equal the true CD value of the sample $\theta_{true}$ V-Scans Although we cannot directly obtain a trace of CD as a function of retardation, we do know that the PEM control voltage Redetermines the retardation $\delta$. If we therefore measure CD $\theta_{meas}$ as a function of $V_{in}$ we will get a trace (a V-scan) which is expected be amenable to analysis such that the relationship between $\delta$ and $V_{in}$ can be determined.
We will represent a V-scan dataset of M points using the following notation:

$$\{(V_i, \theta_i; i=1,2 \ldots M\}. \quad (9)$$

It is assumed this V-scan dataset is measured at a fixed wavelength $\lambda_{meas}$ Relating Retardance ($\delta$) to PEM Drive Voltage (V)

We can describe an arbitrary functional relationship between $\delta$ and V as follows:

$$\delta(V) = F(V, p). \quad (10)$$

Where F is an arbitrary function and ($p = p_1, p_2 \ldots p_N$) is a set of A constants or parameters. These could be, for example, the coefficients of a polynomial in V.
Substituting Equation 11 into Equation 9 and representing $\theta_{max}$ by an additional parameter $p_0$ gives:

$$\theta_{meas}(V) = p_0 \frac{J1[F(V_{in}, p_1, p_2 \cdots p_N)]}{0.581865} \quad (11)$$

This equation is the basis of the calibration method described here. Provided an appropriate function F is chosen, our V-scan datasets should display a curve shape which is correctly described by equation (11). Getting Equation (11) to match the V-scan data involves adjustment of the parameters ($p_0$, $p_1$, ... $p_N$). Such an adjustment can be conveniently achieved using a standard non-linear fitting procedure. The end result of this process is the determination of an accurate relationship between $\delta$ and V at the measurement wavelength in question ($\lambda_{meas}$).

Repeating this process at numerous other wavelengths allows a complete picture of the PEM driving characteristics to be built up across all wavelengths and retardations of interest. The consolidation of this data into a uniform drive equation for all wavelengths and retardations is described in Example 2.

Choice of Retardation Function F

As indicated by equation (2), a linear is a suitable for the retardation function F. As such, the following equation is used for F:

$$F(V, p) = \frac{V}{p_1} \quad (12)$$

The parameter $p_1$ divides instead of multiplies V so that it has the correct units (volts/radian) and standard error values to be utilised directly in determining a wavelength dependent drive function (see Example 2).

Fitting Process

Objective

Substituting Equation (12) into Equation (11) gives rise to the following 2 parameter model to which the V-scan data is to be fitted:

$$\theta_{meas} = (V) = p_0 \frac{J1\left(\frac{V}{p_1}\right)}{0.581865} \quad (13)$$

An unweighted fitting process is then used with the object of minimising:

$$S = \sum_{i=1}^{m} (\theta_i - \theta(V_i, p))^2 \quad (14)$$

Partial Derivatives

The parameter partial derivatives required by the fitting algorithm are as follows:

$$\frac{\partial \theta}{\partial p_0} = \frac{J1\left(\frac{V}{p_1}\right)}{0.581865} \quad (15)$$

$$\frac{\partial \theta}{\partial p_1} = \frac{p_0}{0.581865 p_1} \left\{ J1\left(\frac{V}{p_1}\right) \frac{V}{p_1} \cdot J0\left(\frac{V}{p_1}\right) \right\} \quad (16)$$

Estimates

Estimates for the parameters p can be obtained by treating the standard linear drive equation [Equation (1)] as a starting point for relating S to V. Direct comparison of Equation (1) and Equation (12) gives the following estimate for: $p_1$ $$p_1 = (-0.163 + 0.00273\lambda) \cdot \frac{2}{\pi} \quad (17)$$

To estimate $p_0$ we need to find the first maximum on the V-scan curve, which occurs at a retardation of 1.841 rads. Using Equation (1) with $\delta=1.841$ gives us the approximate voltage corresponding to this retardation:

$$V_{max} = (-0.163 + 0.00273\lambda) \cdot \frac{2 \times 1.841}{\pi} \quad (18)$$

The index $t_{max}$ for the V-scan data point corresponding to this voltage is then given by:

$$i_{max} = \text{Round}\left(\frac{V_{max}}{V_{step}}\right) \quad (19)$$

The estimate for $p_0$ is then given by:

$$p_0 = \theta_{imax} \quad (20)$$

Experimental Details

Samples

Figure 2:
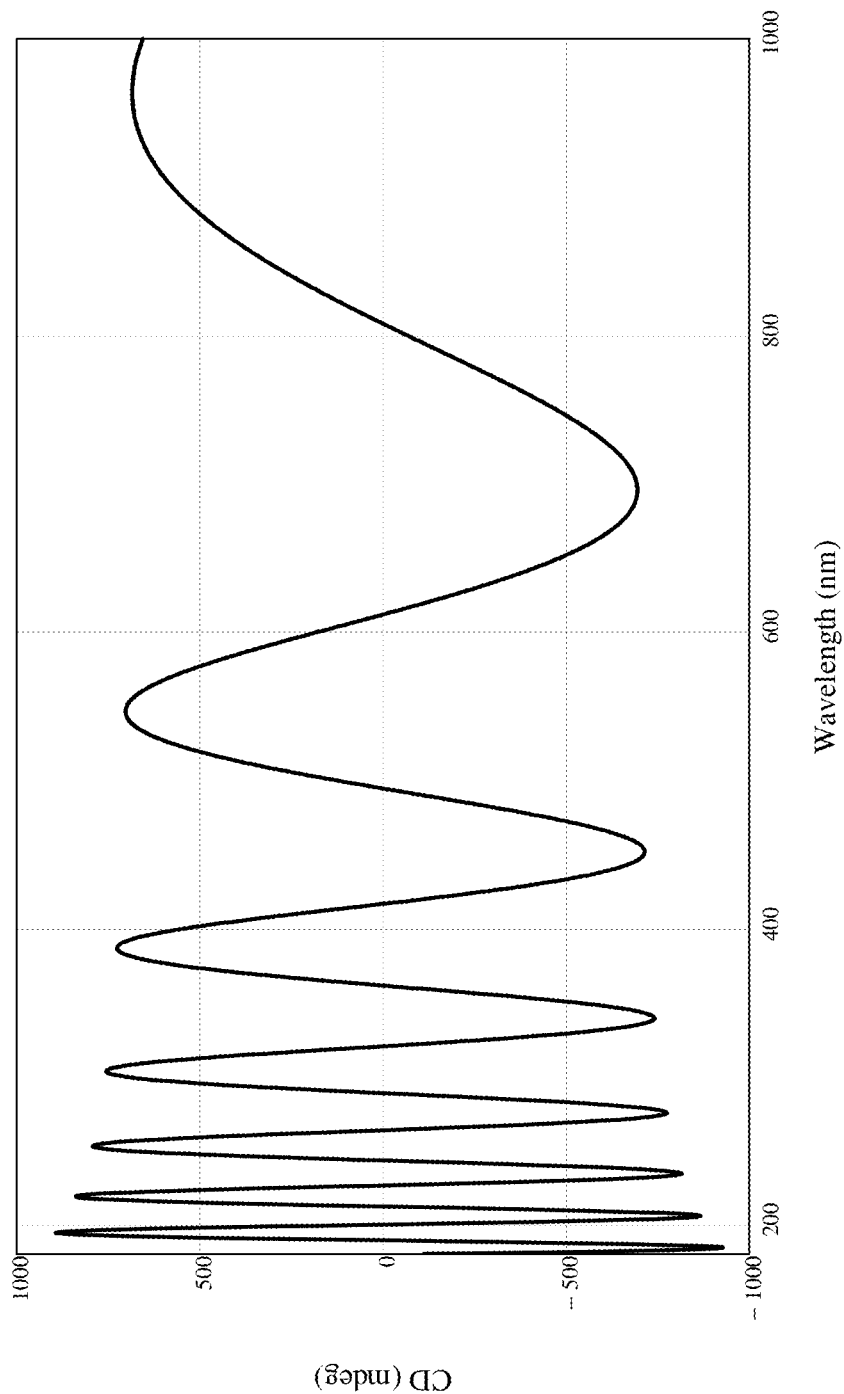
FIG. 2 shows CD spectrum of DichOS optical calibration standard.
Figure 3:
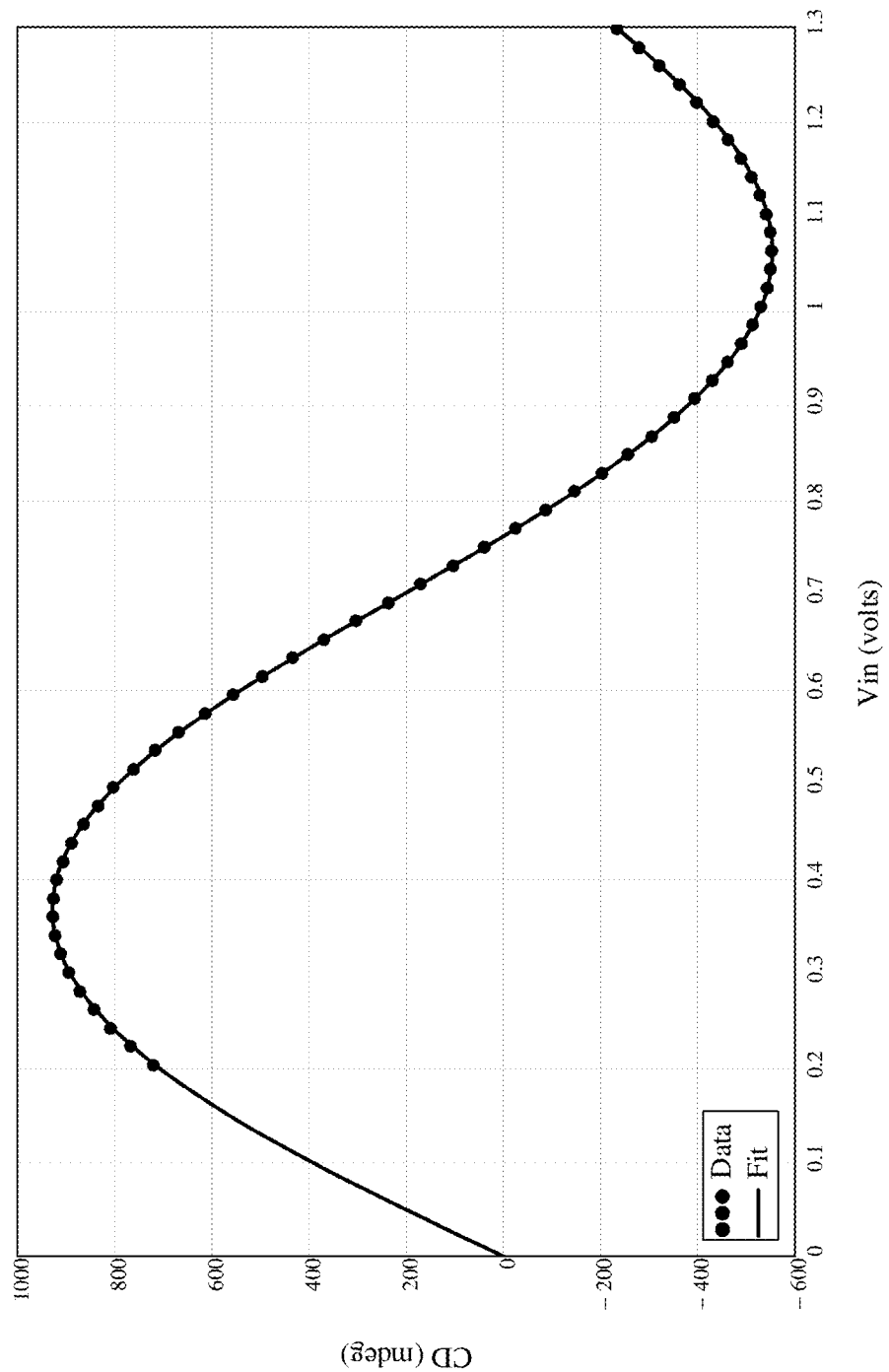
FIG. 3 shows 184.2 nm V-scan and fit.
Figure 4:
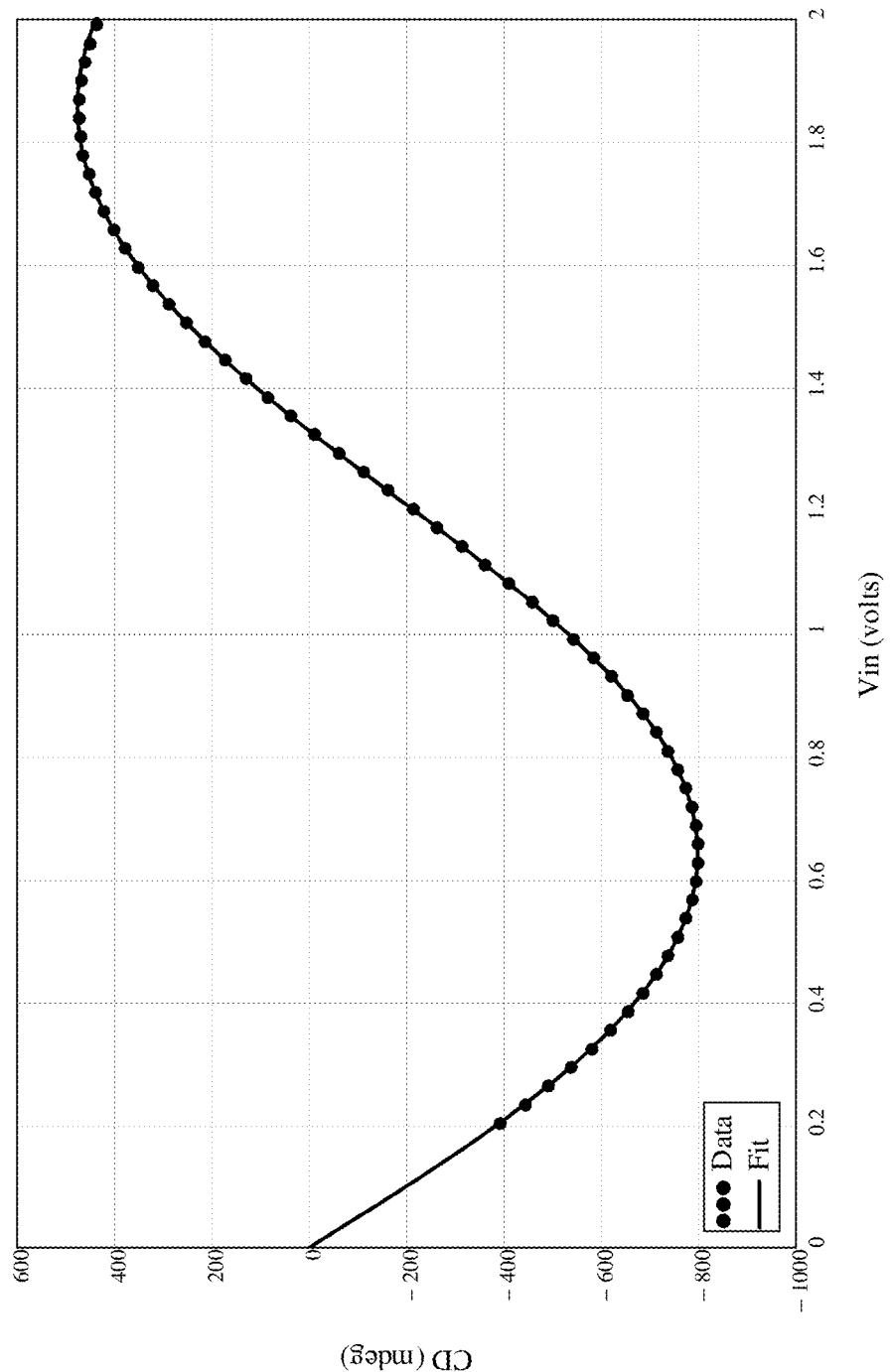
FIG. 4 shows 252.7 nm V-scan and fit.
Figure 5:
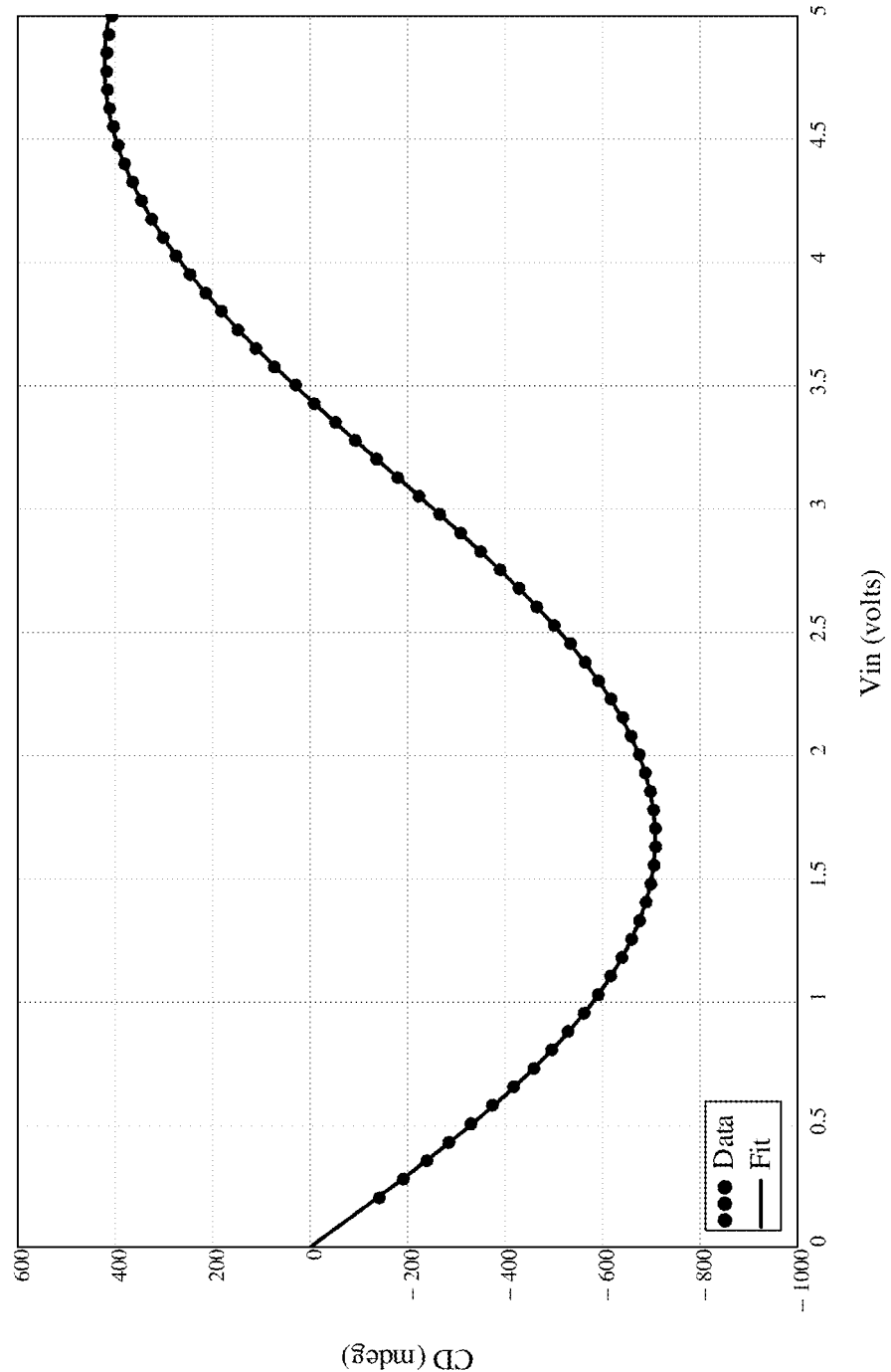
FIG. 5 shows 546.2 nm V-scan and fit.
Figure 6:
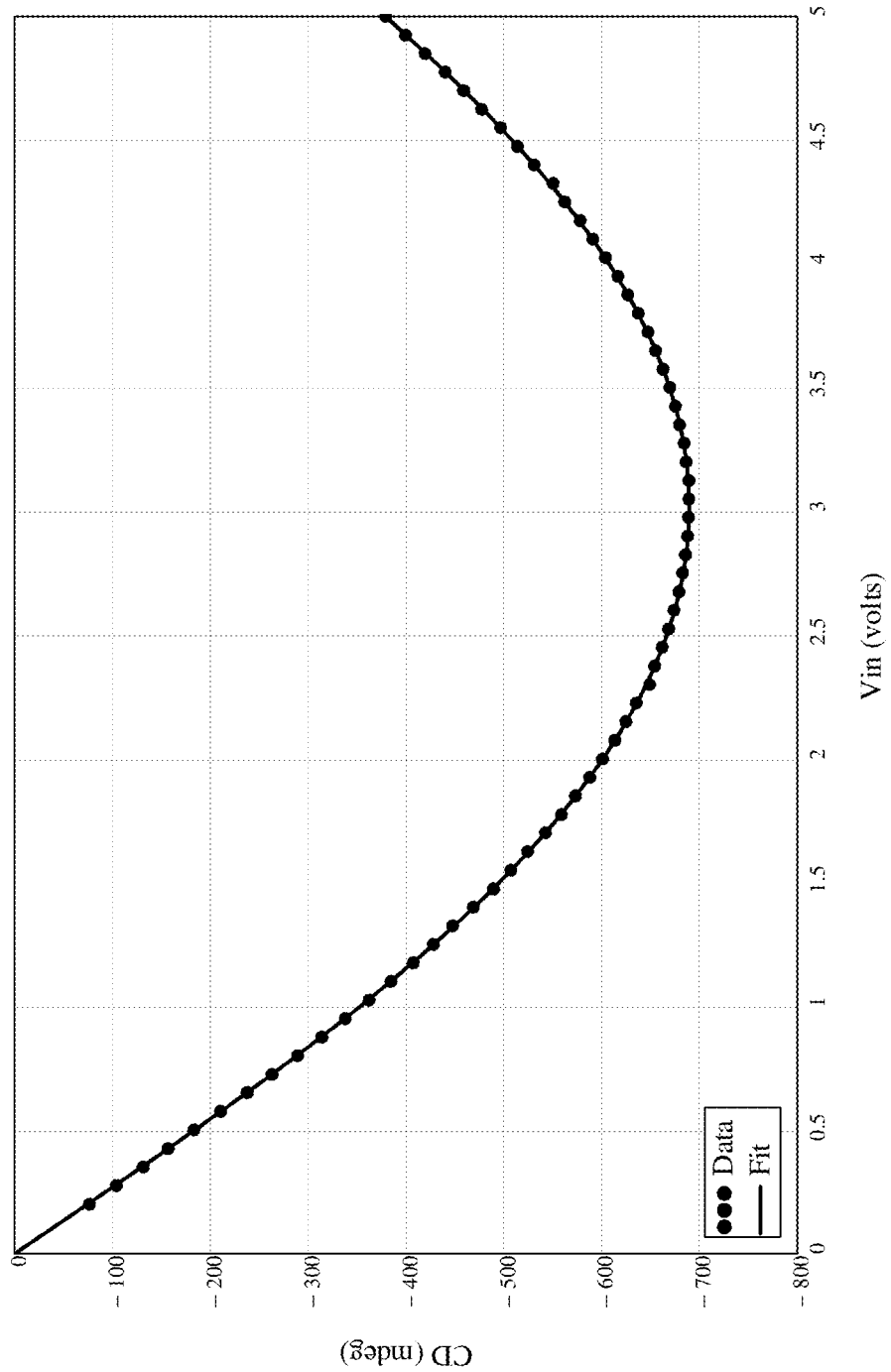
FIG. 6 shows 964.1 nm V-scan and fit.

While in principle any CD sample or set of CD samples may be employed for this method, the ideal sample is one that provides large CD signals across the full wavelength range of the instrument. Recently, an optical CD calibration standard called 'DichOS' has been developed (International Application No. PCT/US2015/054151, incorporated by reference in its entirety herein) which happens to fit these requirements extremely well. This is the sample used for the V-scan calibration Wavelengths The full CD spectrum for the DichOS device is shown in FIG. 2. The optimal points for measurement of V-scans are at the peaks (and troughs) of the DichOS spectrum, since at these points the signal has pure CD character and the signal is maximized. This gives 16 measurement wavelengths as listed in the Table 2 below.

TABLE 2

| Peak No. | Peak Wavelength (nm) |
|---|---|
| 1 | 175.29 |
| 2 | 184.26 |
| 3 | 194.26 |
| 4 | 205.64 |
| 5 | 218.79 |
| 6 | 234.24 |
| 7 | 252.72 |
| 8 | 275.25 |
| 9 | 303.30 |
| 10 | 339.15 |
| 11 | 386.46 |
| 12 | 451.54 |
| 13 | 546.20 |
| 14 | 695.61 |

TABLE 2-continued

| Peak No. | Peak Wavelength (nm) |
|---|---|
| 15 | 964.10 |
| 16 | 1577.53 |

Measurement Conditions

The measurement conditions for recording V-scans were as follows:
Bandwidth: 1 nm
Time/point: 0.25 sec
Points (M): 200

The scan direction was from high voltage to low, with a few seconds settling time at the beginning of the scan. Given that the monochromator did not need to move between points, each scan took less than 1 minute. Given that the CD signal from the DichOS device is so high, there was no need to record and subtract a blank baseline.

Voltage Scanning Range

The PEM can be driven with an input voltage V ranging from 0 to 5 V. Equation (2) shows that much greater retardations are possible at low wavelengths than high ones over this voltage range. Practically speaking however, it is rarely required to drive the PEM at retardations much greater than the half-wave condition (n radians), and it more desirable to obtain accurate calibration over a retardation range of practical interest than to attempt to cover the maximum range possible at every wavelength investigated. This means than the abscissa range of each V-scan should be adjusted dependent on the measurement wavelength $\lambda_{meas}$ so as to cover an appropriate retardation range. If we again use the linear drive function [Equation (1)] as an approximation, then a suitable voltage scanning range is given by:

$$V_{high} = (-0.163 + 0.00273\lambda_{meas}) \cdot \delta_{high} \cdot \frac{2}{\pi} \quad (21)$$

A lower voltage is also set to avoid instability issues at very low drive levels.

$$V_{low} = 0.2 \quad (22)$$

A suitable value for $\theta_{high}$ is 6 radians. This can be substituted in to equation (21) to provide a value for $V_{high}$, which has to be capped at 5V if the calculation exceeds this value. The number of points M in the V-scan dictates the step interval $V_{step}$ $$V_{step} = \frac{V_{high}}{M} \quad (23)$$

V-Scan Fit Results

Example V-Scan Traces and Fits

Examples of V-scan datasets are shown in FIGS. 3, 4, 5 and 6 for four selected wavelengths: 184.2 nm, 252.7 nm, 546.2 nm and 964.1 nm.

The differing voltage ranges for each scan (dependent on wavelength) $\lambda_{meas}$ may be observed, as defined by Equations (21) and (22). At the longer wavelengths (546.2 nm and 964.1 nm) the upper limit is the maximum value of the control voltage input $V_{in}=5V$.

The curves are shown fitted with the functions defined in equation (13) via the fitting process described above.

Meaning of the Fit Parameters

Examination of Equation (13) allows the meaning of the parameters p to be deduced and then given alternative, more descriptive names:

$p_0$ is the first maximum of the V-scan curve (occurring at a retardation of 1.841 rads), and can therefore be referred to as 'CDmax'. This is equal to the CD signal of the sample (DichOS standard) at the wavelength $\lambda_{meas}$. This parameter is not relevant to the PEM calibration, highlighting the fact that this technique does not depend on the CD magnitude of the sample used.

$p_1$ is the rate of change of voltage with respect to retardation (in volts/rad). We may therefore refer to it as 'Vrate'.

Fit Parameters Vs. Wavelength

Figure 7:
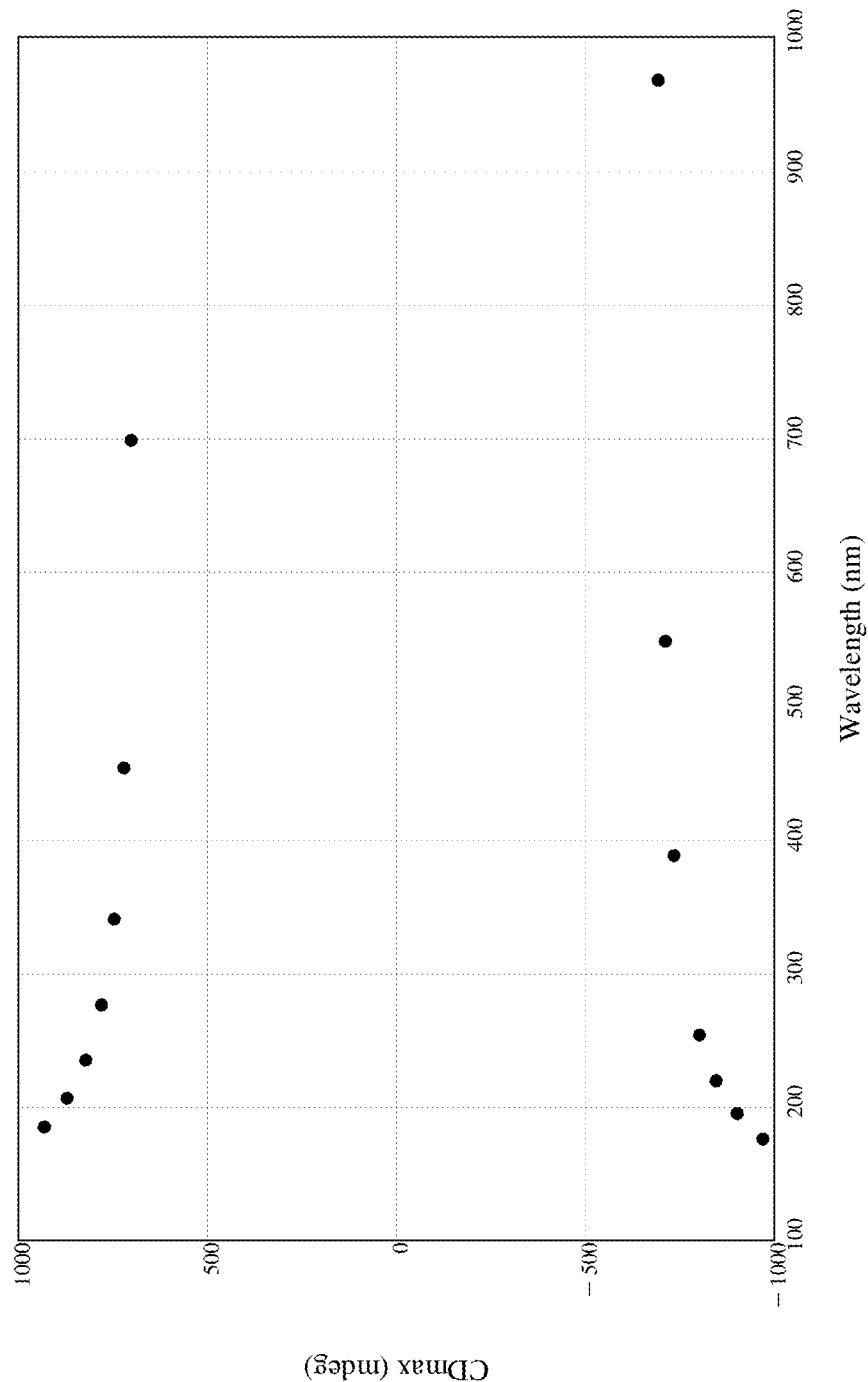
FIG. 7 shows parameter CDmax (p0) values vs. wavelength.
Figure 8:
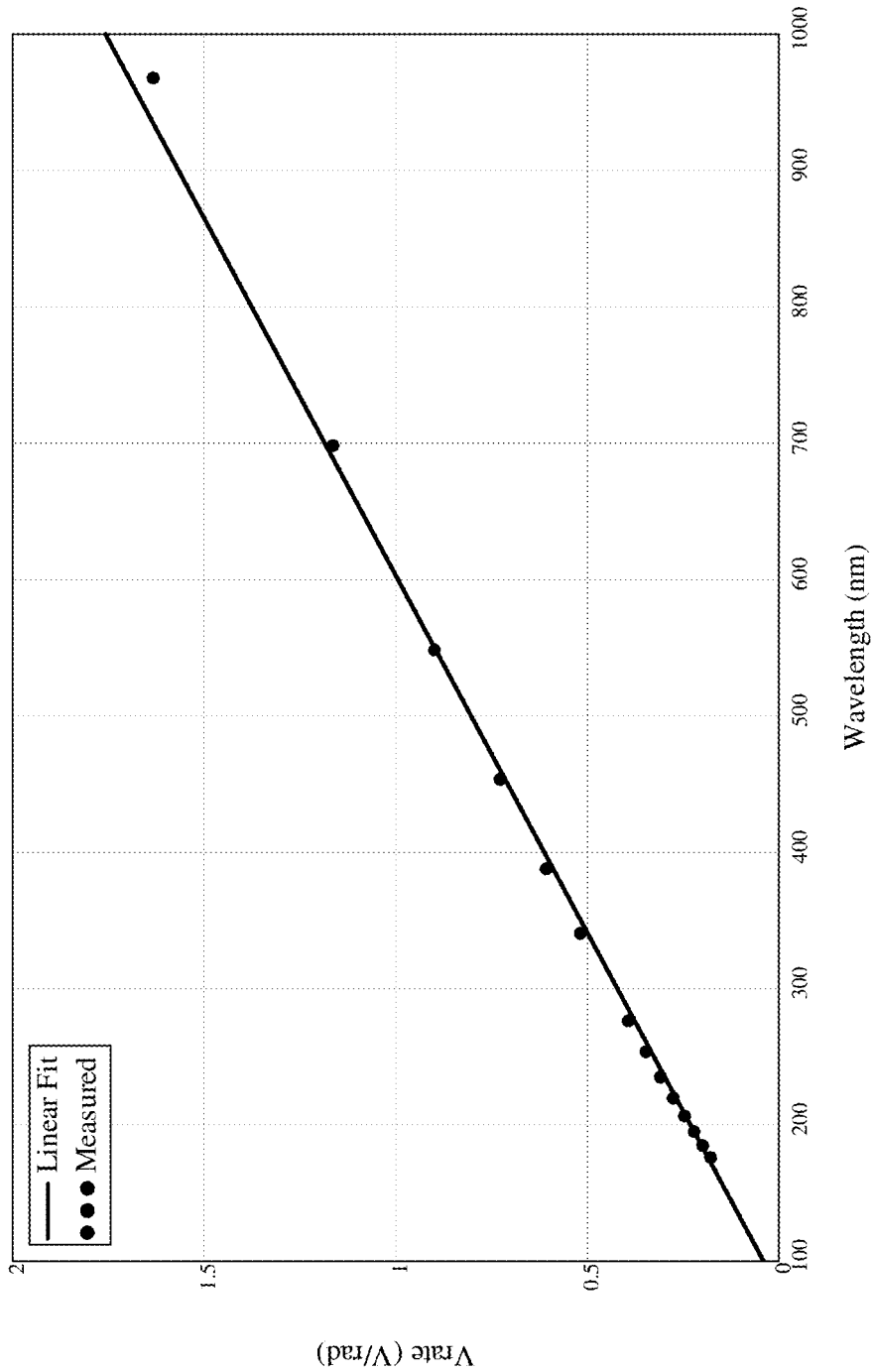
FIG. 8 shows parameter Vrate (p1) values vs. wavelength with linear fit overlaid FIG. 9 show the residual of linear fit to Vrate parameters.

The parameter results CDmax and Vrate, for all wavelengths measured, are plotted in FIGS. 7 and 8. Standard error bars are not shown since they are too small to be visible on the scale of the graphs shown.

The collection of Vrate parameters were fitted with a straight line function of the form:

$$L(\lambda, m, c) = (m\lambda + c) \cdot \frac{2}{\pi} \quad (24)$$

A weighted least squares procedure was used for the fit, with the square of the parameter standard error values resulting from the fitting process describe above used as inverse weights, with the object of minimizing:

$$S = \sum_{i=1}^{P} \frac{(Vrate_1 \; L(\lambda, m, c))^2}{\sigma^2_{Vrate_1}} \quad (25)$$

Where P is the total number of wavelengths measured. This resulted in the following values for the linear fit parameters to equation (24):

TABLE 3

| m | c |
|---|---|
| 0.00299878 | −0.23586078 |

Figure 9:
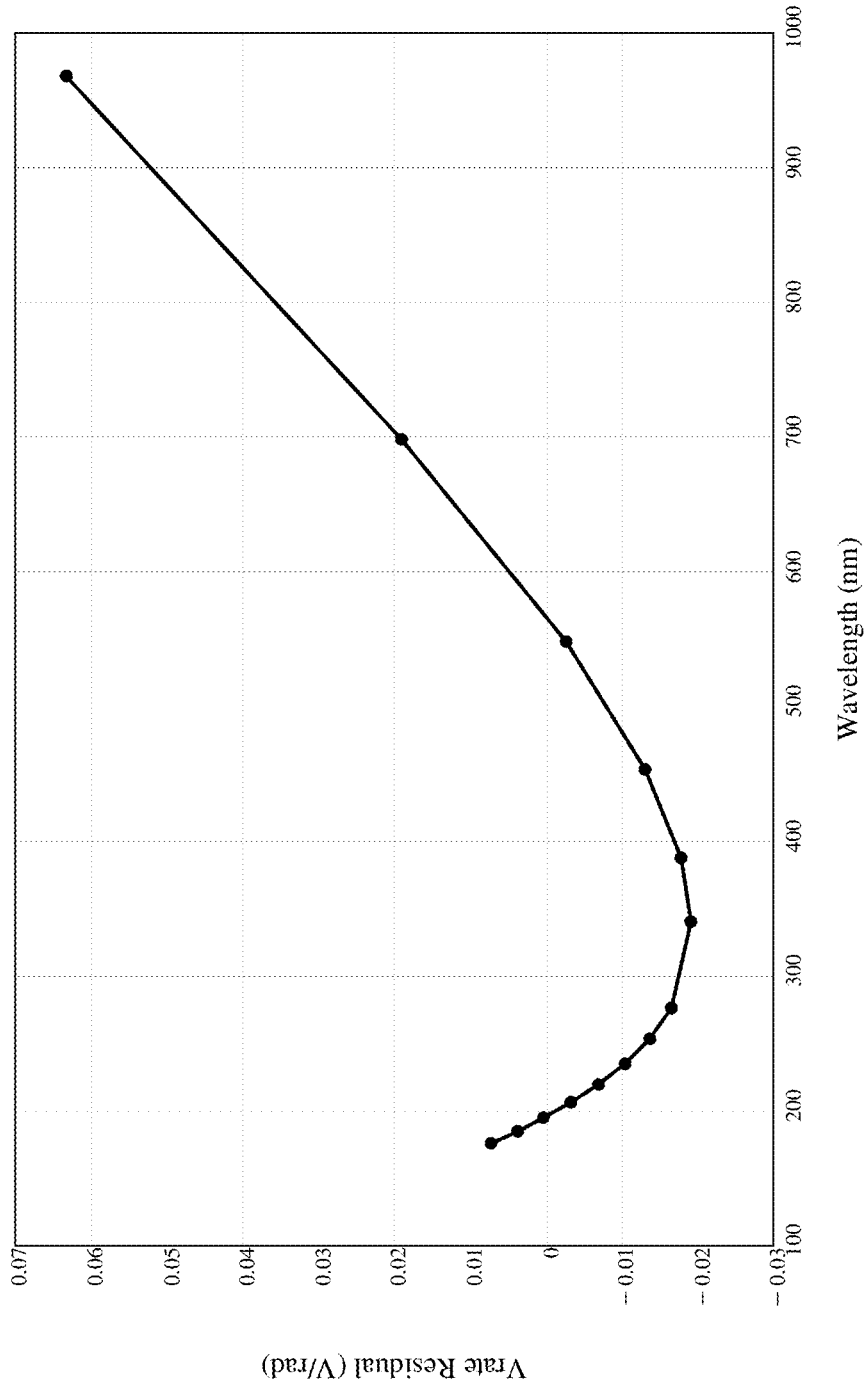

The parameter values above are similar but not identical to those of the standard linear drive function shown in Equation (1). The linear fit is shown overlaid with the data in FIG. 8, while the residual error of the fit is shown in FIG. 9. There is very clear evidence of a systematic error, indicating that the linear drive function is not correctly modelling the behaviour of the PEM at all wavelengths. From the residual plot we may deduce that the drive behaviour is approximately linear in the Visible to red region, but that there is a definite departure from linearity in the UV (400 nm and below).

Optical Rotation V-Scans

The same method could be applied for an instrument measuring optical rotation. In this instance, the predicted curve shape is based on the J2 Bessel function, and the resulting V-scan fitting requirements are as detailed below. All other aspects of the procedure are identical to those used for CD V-scans.

Optical Rotation V-scans are fitted to the following function:

$$p(V, p) = p_0 \cdot \frac{J2\left(\frac{V}{p_1}\right)}{0.43178} \quad (26)$$

With the object of minimising:

$$S = \sum_{i=1}^{m} (p_i - p(V_i, p))^2 \quad (27)$$

With respect to the parameters p. It is assumed that OR measurements are performed at the 'standard' retardation of 2.405 radians, Conclusion Described herein is a method which allows accurate PEM calibration over the full operational wavelength range of a given CD instrument. The method is related to a technique known in the art based on locating the first zero of the J1 Bessel function, but the present application has improved the method by utilising all the points in the V-scan instead of just the zero position, thereby achieving much greater accuracy and robustness.

The results of applying this method highlights the inaccuracies inherent in the standard linear drive function [Equation (1)] when working in the UV region below 400 nm. The consequences of this for CD measurement accuracy have been discussed.

The present application teaches that in the UV region (below 400 nm), the control voltage $V_{in}$ required for a given retardation is not linearly related to wavelength, where the true voltage in this region is generally lower that predicted by the standard linear drive function, with increasing departure towards lower wavelengths (see FIGS. 8 and 9).

When performed using the DichOS optical standard, the V-scan method allows PEMs to be calibrated with greater accuracy and down to a lower wavelength (170 nm) than was previously possible. This is due to the intrinsic accuracy and robustness of the method combined with the low transmission and high CD signal level of the DichOS standard.

The V-scan method of calibration is highly amenable to complete automation, requiring only that a suitable control program be written enabling collection and processing of all the required datasets.

The V-scan method is also applicable to detection modes other than CD, such as optical rotation as described supra, requiring only a simple change to the V-scan fitting function.

Example 2. Improved Photoelastic Modulator Drive Function: Derivation

As demonstrated in Example 1, an accurate PEM calibration performed at multiple wavelengths from the VUV into the NIR, clearly demonstrates that using a linear drive function (for example Equation (1)) does not provide accurate retardation control at all wavelengths, with a deviation from linearity particularly evident in the UV region (below 400 nm). This has probably not be observed before due to the lack of a suitably accurate and sensitive calibration method, and the lack of a test sample providing large CD amplitudes across the wavelength range. Realising the shortcomings in the linear drive function, we endeavoured to find a more accurate drive equation, starting from physical principles. The derivation of such a function is discussed below.

The optical retardation generated by a photoelastic modulator (PEM) is governed by the control voltage input $V_{in}$, which typically ranges from 0 to 5V. This voltage controls the amplitude of the dynamic stress applied to the optical element of the PEM over each modulation cycle.

To calculate the correct voltage $V_{in}$ to apply at a given wavelength λ in order to produce a required retardation Φ (in radians), a suitable drive function is required. The standard drive function, used for many years, is the linear relationship below given in Equation (1), and reproduced below in Equations (28) and (29)

$$V_{in} = (c + m\lambda) \cdot \frac{2}{\pi} \cdot \Phi \quad (28)$$

Where the parameters c (intercept) and m (slope) have the nominal values:

$$c = -0.163, m = 0.00273 \quad (29)$$

The 2/π factor appearing in equation (28) is simply reflects the fact that the drive curve was originally determined empirically for a ¼ wave retardation condition (Φ=π/2 radians). Standard practice has generally been to rely on the nominal values of c and m above rather than to individually calibrate each PEM.

Derivation of PEM Drive Function

The objective of the following studies was to derive a PEM drive function (relating control voltage $V_{in}$ to wavelength λ for a retardation Φ) from a physical model of the refractive index for the material comprising the PEM optical element First, the refractive index change resulting from an applied stress σ was considered:

$$\Delta n_\lambda = K_\lambda \sigma \quad (30)$$

Where $K_\lambda$ is the stress-optic coefficient for the material comprising the PEM optical element (which in this instance is fused silica). The λ subscripts above indicate a wavelength dependence.

The assumption is made that the peak stress over one oscillation cycle of the PEM is proportional to the applied control voltage input $V_{in}$:

$$\sigma = m \cdot V_\lambda \quad (31)$$

Therefore:

$$\Delta n_\lambda = K_\lambda \cdot m \cdot V_{in} \quad (32)$$

If the path length through the optical element (PEM thickness) equals d, then the optical path difference is given by:

$$\Lambda_\lambda = d \cdot \Delta n_\lambda \cdot m \cdot d \cdot V_{in} \quad (33)$$

And finally to express the retardation as a phase shift in radians, the above is multiplied by 2π/λ:

$$\Phi = \frac{K_\lambda \cdot m \cdot d \cdot V_m \cdot 2\pi}{\lambda} \quad (34)$$

Which can then be rearranged for $V_{in}$:

$$V_{in} = \frac{\Phi \cdot \lambda}{K_\lambda \cdot m \cdot d \cdot 2\pi} \tag{35}$$

This equation indicates what control voltage $V_{in}$ to apply to generate a peak retardation $\Phi$ in radians. But this equation is of little use unless an expression for the wavelength dependence of the stress-optic coefficient $K_\lambda$ is derived, which is defined as the refractive index change induced by a unit of applied stress:

$$K_\lambda = \frac{\Delta n_\lambda}{\sigma} \tag{36}$$

Beginning with the simplest possible Sellmeier expression for the refractive index n:

$$n^2 = 1 + \frac{A\lambda^2}{\lambda^2 - B^2} = \frac{(1+A)\lambda^2 - B^2}{\lambda^2 - B^2} \tag{37}$$

Where A represents the oscillator strength and B the wavelength of an electronic resonance in the material. Normally, a refractive index function would be modelled using several terms, corresponding to several electronic resonances at widely separated wavelengths. In this instance, the simple one term model above is justified by considering the fact that, for fused silica, the nearest IR resonance (somewhere near 9000 nm) is far away from the normal operating wavelength range of the PEM. Using just one resonance in the VUV should then give a reasonable representation of the refractive index in the region that interests us (160 nm to 2000 nm).

It is assumed that, for a unit of applied stress a, the effective change in n (i.e. the induced birefringence $\Delta n$ relative to the stress axis) is induced by a perturbation to the oscillator strength A. Taking the derivative of equation ((37) above:

$$2n \cdot \frac{\partial n}{\partial A} = \frac{\lambda^2}{\lambda^2 - B^2} \tag{38}$$

So that for a small change in oscillator strength $\Delta A$, the corresponding index change is:

$$\Delta n = \frac{1}{2n} \cdot = \frac{\lambda^2}{\lambda^2 - B^2} \cdot \Delta A \tag{39}$$

Substituting for it from equation ((37):

$$\Delta n = \frac{1}{2} \cdot \frac{\sqrt{\lambda^2 - B^2}}{\sqrt{(1+A)\lambda^2 - B^2}} \cdot \frac{\lambda^2}{\lambda^2 - B^2} \Delta A \tag{40}$$

Which, after simplifying and replacing (1+A) with the constant C, becomes:

$$\Delta n = \frac{1}{2} \cdot \frac{\lambda^2}{\sqrt{C\lambda^2 - B^2}\sqrt{\lambda^2 - B^2}} \Delta A \tag{41}$$

Next it is assumed that $\Delta A$ (the shift in oscillator strength) is simply proportional to the applied stress $\sigma$, giving $$K_\lambda = \frac{\Delta n}{\sigma} = \frac{D\lambda^2}{\sqrt{C\lambda^2 - B^2}\sqrt{\lambda^2 - B^2}} \tag{42}$$

Where the constant D absorbs the proportionality between $\sigma$ and $\Delta A$ and the factor of ½ in equation ((41) above. What results is an expression for the stress optic coefficient $K_\lambda$ as a function of wavelength (with several undetermined constants). Substituting this into equation ((35) gives:

$$V_{in} = \frac{E \cdot \sqrt{C\lambda^2 - B^2}\sqrt{\lambda^2 - B^2}}{\lambda} \Phi \tag{43}$$

Where the constant E now replaces all of the constant factors which would otherwise appear in the equation.

The numerator of this equation may be expanded into a power series with constant coefficients dependent on B and C. Using new symbols $\alpha$, $\beta$ etc. for these constant coefficients, we may write:

$$E \cdot \sqrt{C\lambda^2 - B^2}\sqrt{\lambda^2 - B^2} = \alpha + \beta\lambda^2 + \gamma\lambda^4 + \tag{44}$$

Then if we approximate by considering just the first two terms in this expansion, we have:

$$V_{in} = \frac{\alpha + \beta\lambda^2}{\lambda} \cdot \Phi = (\alpha\lambda^{-1} + \beta\lambda)\Phi \tag{45}$$

This gives the input voltage $V_{in}$ required to generate a peak retardation $\Phi$ in radians, where $\alpha$ and $\beta$ are constants to be determined by a suitable PEM calibration procedure (e.g. the V-scan method). The equation contains a linear term and a reciprocal term in wavelength $\lambda$. (It turns out that, had we chosen to perturb the resonance wavelength B, rather than oscillator strength A, we would have arrived at the same equation.)

Bearing in mind the approximations inherent in the derivation of equation ((45), the addition of a constant term should provide an extra degree of freedom to improve the fit to the actual drive function. The drive function then has the following form:

$$V_{in} = (\alpha\lambda^{-1} + \beta\lambda + \gamma)\Phi \tag{46}$$

Finally we note that this is similar to the standard linear drive equation [equation (28)], but with the addition of a reciprocal term in wavelength. It seems sensible then to recast the equation such that it has the same form as equation (28) but with the additional reciprocal term included:

$$V_{in} = (c + m\lambda + n\lambda^{-1}) \cdot \frac{2}{\pi} \Phi \tag{47}$$

This function will be referred to as the 'augmented drive function', since it is similar to the standard linear drive but with a reciprocal term added. It is of interest to know how well this new drive function fits to the measured V-scan data in comparison with the standard linear drive equation. This is examined in Example 3.

Zero Crossing Wavelength

From published refractive index models of fused silica (Optical constants of silica glass from extreme ultraviolet to far infrared at near room temperature, Applied Optics, Vol 46, No. 33 (2007)), a resonance pole (disregarding damping) close to 116 nm is expected, corresponding to a VUV absorption peak. This wavelength should in theory correspond with the zero crossing point of the PEM drive function. For the augmented drive function, the zero crossing is given by:

$$\lambda_0 = \frac{-c + \sqrt{c^2 - 4mn}}{2m} \qquad (48)$$

A value of $\lambda_0$ which lies close to 116 nm will therefore provide further confirmation that the augmented drive model conforms with the known physical behaviour of fused silica.

Conclusion

A new PEM drive function has been determined (referred to herein as the "augmented drive") which is more accurate than the linear drive function which is currently used.

This is similar to the existing linear drive [equation (28)], but with the addition of a reciprocal term in wavelength. This additional term improves the accuracy of the drive in the VUV region. In the VIS and IR region the curve tends towards a linear profile similar to the standard drive function.

Default values for the drive parameters, given below, cause the augmented drive to correspond with the standard linear drive [Equation (28)]. These are appropriate estimate values in a non-linear fitting process c 0.163
m 0.00273
n 0 The meanings of c and m are slightly different with the augmented drive compared with the standard linear drive, in that they now refer to the slope of the long wave linear asymptote of the drive curve and its intercept when this line is extended back to the y axis. With the default values above the drive profile is identical to the standard linear drive and these parameters then retain exactly their original meanings.

Example 3. Reduction of CD Measurement Errors with the Augmented PEM Drive Function The experiments described herein examine the improvement in CD measurement accuracy which results from using the augmented drive function (described supra) instead of the standard linear drive to control the retardation of a photoelastic modulator (PEM).

Methods

V-scan PEM calibrations were performed as described in using the DichOS standard (International Application No. PCT/US2015/054151, incorporated by reference in its entirety herein) to provide large CD signals at multiple wavelengths from ~175 nm to ~970 nm. This provided accurately measured $V_{rate}$ values (in volts/rad) which were then fitted to the augmented drive function, providing the parameters c, m and it. The augmented drive function is reproduced in equation ((49) below.

$$V_{in\_aug} = (c + m\lambda + n\lambda^{-1}) \cdot \frac{2}{\pi} \cdot \Phi \qquad (49)$$

The standard linear drive function is reproduced in equation ((50) below.

$$V_{in\_lin} = (-0.163 + 0.00273\lambda) \cdot \frac{2}{\pi} \cdot \Phi \qquad (50)$$

From the augmented fit parameters c, m and n, the zero crossing wavelength (resonance pole) is calculated:

$$\lambda_0 = \frac{-c + \sqrt{c^2 - 4mm}}{2m} \cdot \Phi \qquad (51)$$

It is assumed that CD measurements are performed at a PEM retardation of $\Phi = 13841$ rads (105.48°) since this gives maximal AC signal amplitudes and has the lowest sensitivity to retardation errors, being at the peak of the J1 Bessel function.

The correct value of the control voltage input at each measurement wavelength is derived from the measured $V_{rate}$ values (as determined from V-scan calibration) as follows:

$$V_{in} = V_{rate} \times \Phi \qquad (52)$$

Next, the control voltage errors for the augmented and linear drive functions are determined:

$$\Delta V_{in} = V_{in_{aug}} - V_{in} \qquad (53)$$

$$\Delta V_{in\_lin} = V_{in\_lin} - V_{in} \qquad (54)$$

From the control voltage errors the retardation errors can be determined by dividing by the measured values of $V_{rate}$. This then leads to the following equations for retardation error for the augmented and linear drives:

$$\Delta \Phi_{aug} = \frac{\Delta V_{in\_aug}}{V_{rate}} - \Phi \qquad (55)$$

$$\Delta \Phi_{lin} = \frac{\Delta V_{in\_lin}}{V_{rate}} - \Phi \qquad (56)$$

Finally, how the retardation errors translate into relative CD measurement errors is determined (as a percentage). This may be shown to be given by:

$$ACD\% = \left( \frac{J1(\Phi + \Delta \Phi)}{J1(\Phi)} - 1 \right) \times 100 \qquad (57)$$

Where, as mentioned above, the PEM retardation $\Phi$ 13841 rads. Since the J1 function is at a maximum for this retardation, all CD errors due to retardation errors will be negative (i.e. peak magnitudes will be underestimated).

Results

PEM A: Rectangular Format

A V-scan calibration was performed on a rectangular format PEM, with Vrate parameters fitted to the augmented drive function. The parameters of the fit were:

TABLE 4

| | |
|---|---|
| c | −0.03147 |
| m | 0.0026136 |
| n | −28.09430 |

Figure 10:
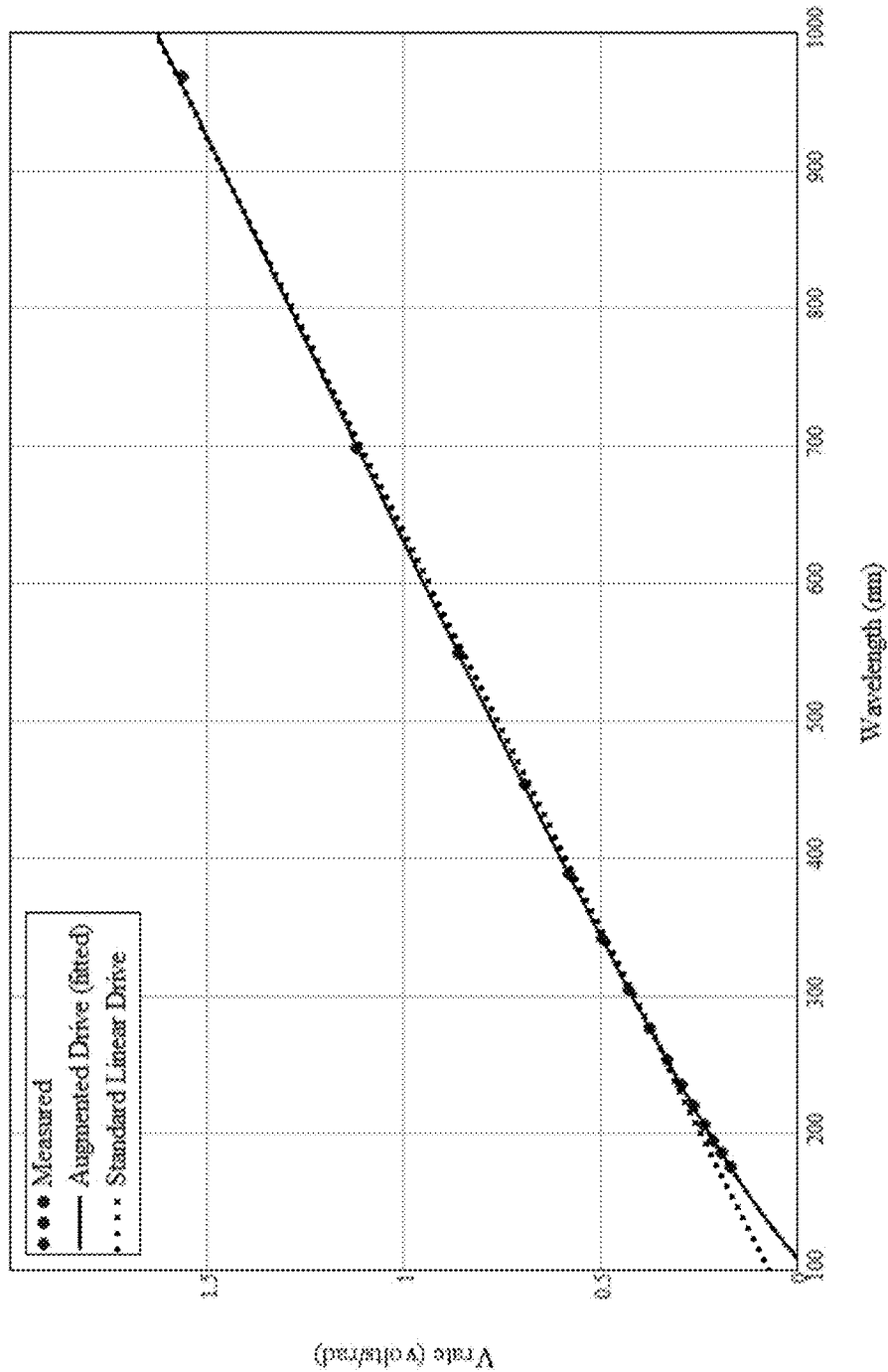
FIG. 10 shows standard linear drive and augmented fit to Vrate parameters (rectangular format PEM, "PEM A").

The resulting augmented drive curve is plotted in FIG. 10, overlaid with the standard linear drive curve. Here it may be observed that the linear drive is a reasonable fit to the measured $V_{rate}$ values in the visible/NIR region but is unable to follow the true shape of the curve in the UV region below ~300 nm. There is also a departure from the true $V_{rate}$ values in the NIR, however this error in proportion to $V_{rate}$ is fairly small. The augmented drive function is clearly a much better fit and is able to follow the true curve closely as it departs from linearity in the UV region.

The resonance pole was calculated as $\lambda_0$=109.87 TWFI, close to the expected position of ~116 nm.

Figure 11:
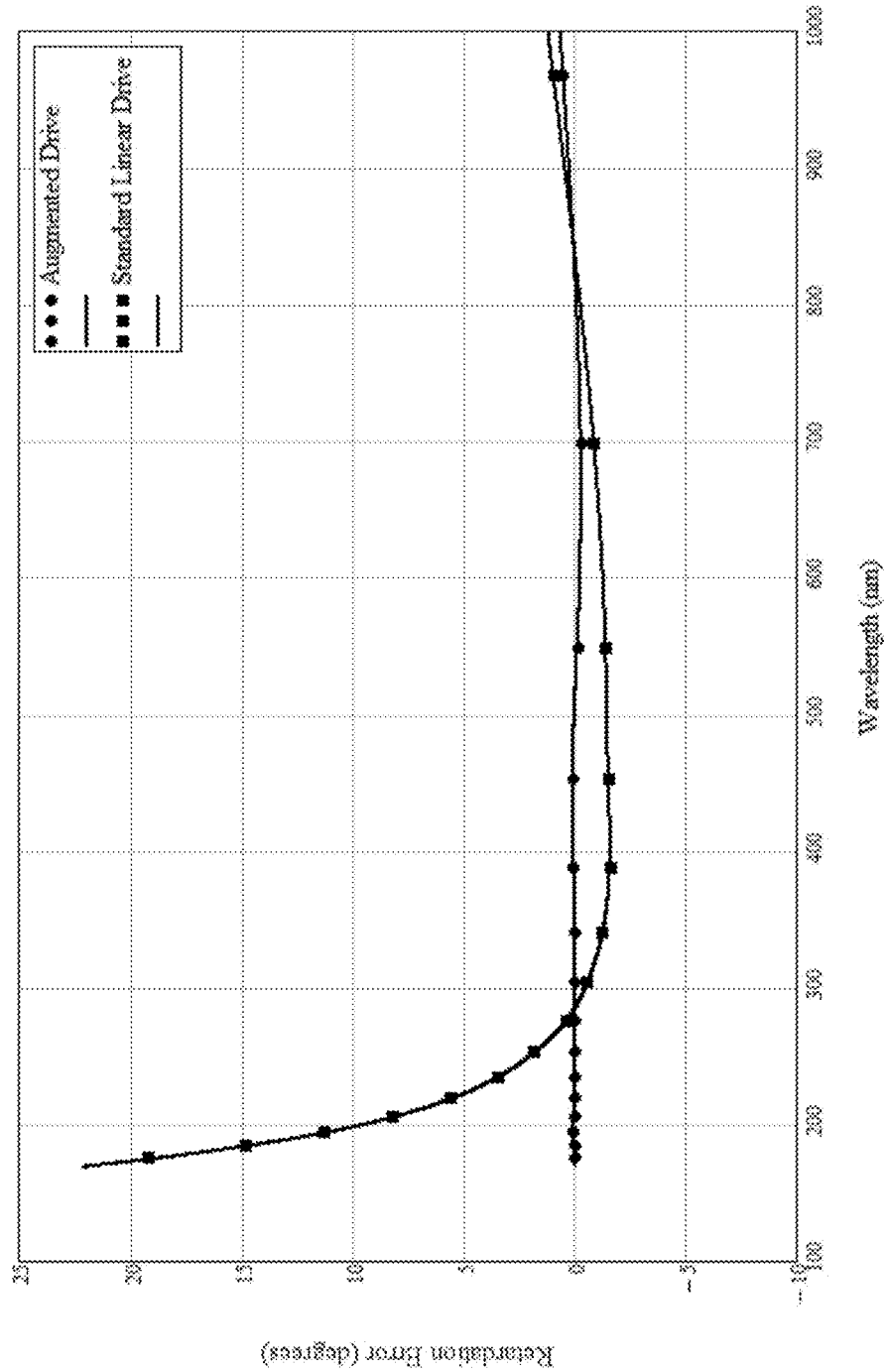
FIG. 11 shows retardation residuals of standard linear drive and augmented fit (rectangular format PEM, "PEM A").

The corresponding retardation errors (in degrees) for the augmented and linear drive are plotted in FIG. 11, with cubic spline interpolation functions overlaid. Here a considerable difference is seen between the two drive functions, with the linear drive having over 25° error at 170 nm while the augmented drive lies comfortably within a ±+1 error band (i.e. <1% at $\Phi$=105.5°).

Figure 12:
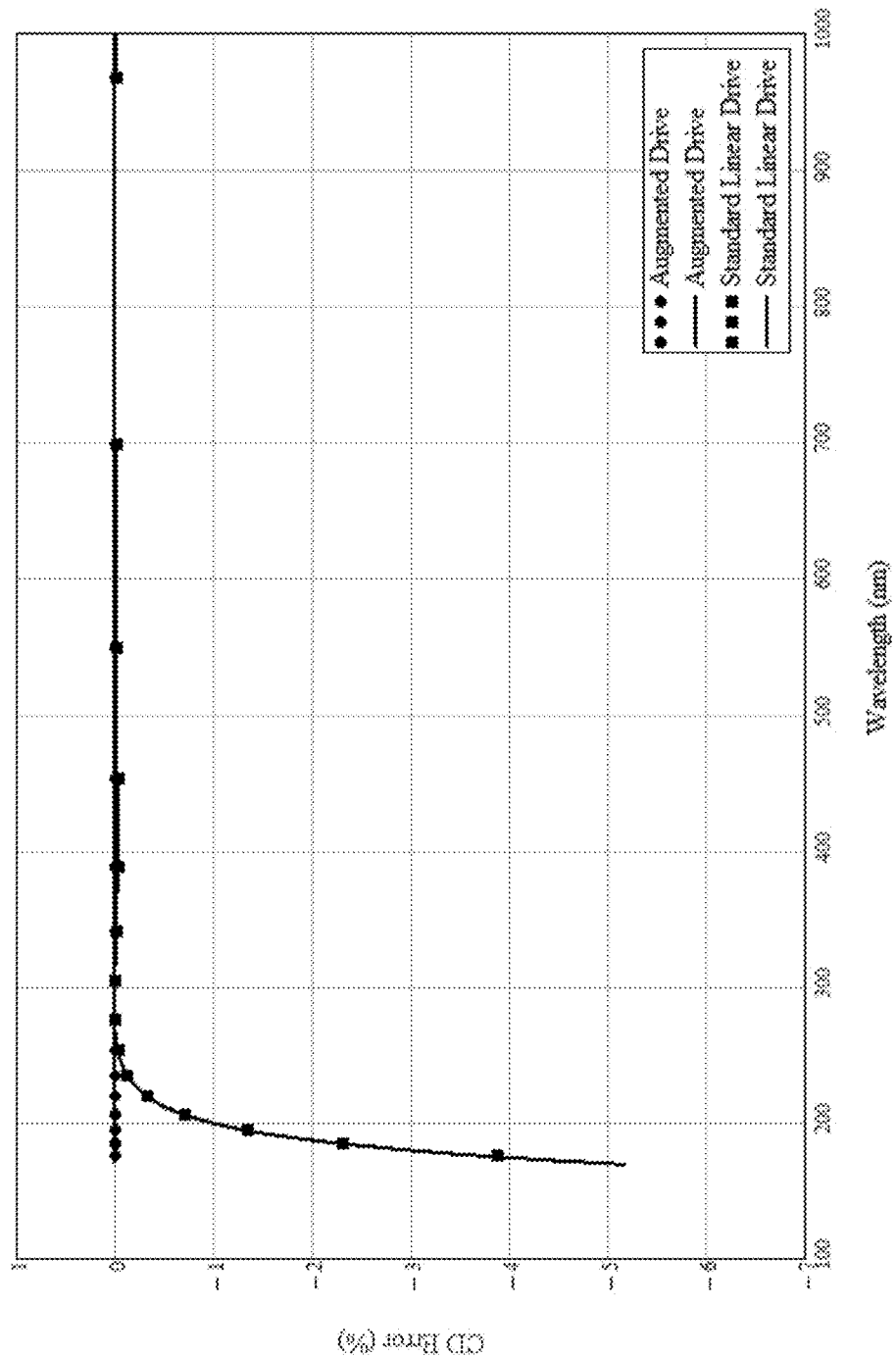
FIG. 12 shows CD errors of standard linear drive and augmented fit (rectangular format PEM, "PEM A").
Figure 13:
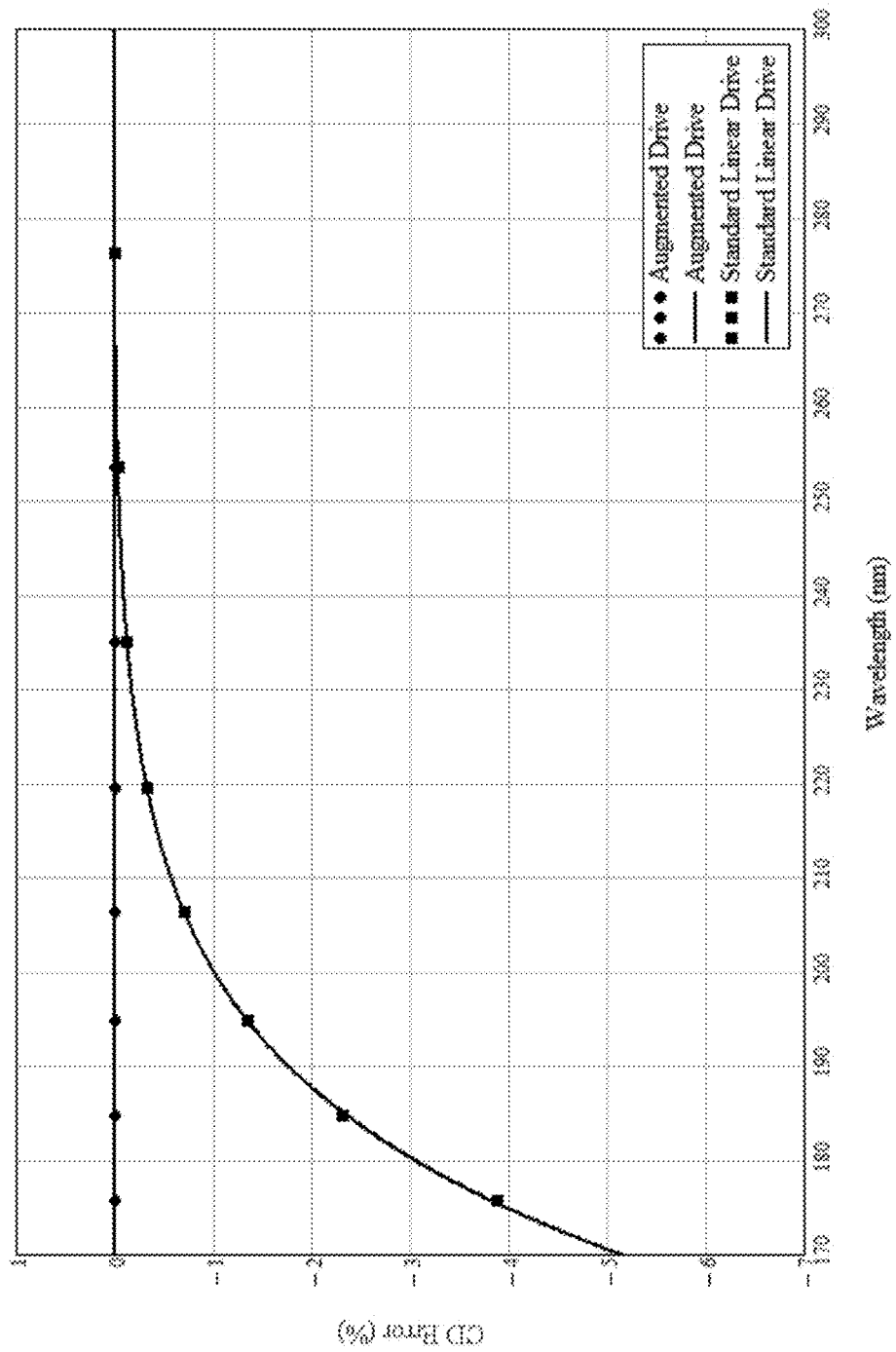
FIG. 13 shows CD errors of standard linear drive and augmented fit in the UV region (rectangular format PEM, "PEM A").

The relative CD errors resulting from the above retardation errors are plotted in FIG. 12 and FIG. 13. Here, the error is essentially zero for the augmented drive at all wavelengths. For the linear drive the error is insignificant above ~300 nm. Below this wavelength the error increases in an accelerating manner, reaching approximately −3% at 180 nm and −5.2% at 170 nm. The superiority of the augmented drive with regard to CD measurement accuracy is clearly demonstrated by these two plots.

PEM B: Octagonal Format

A V-scan calibration was performed on an octagonal format PEM. The resulting augmented fit parameters were:

TABLE 4

| | |
|---|---|
| c | −0.03147 |
| m | 0.0026136 |
| n | −28.09430 |

The resonance pole was calculated as $\lambda_0$=111.8 Iran, close to the expected position of ~116 nm.

Figure 14:
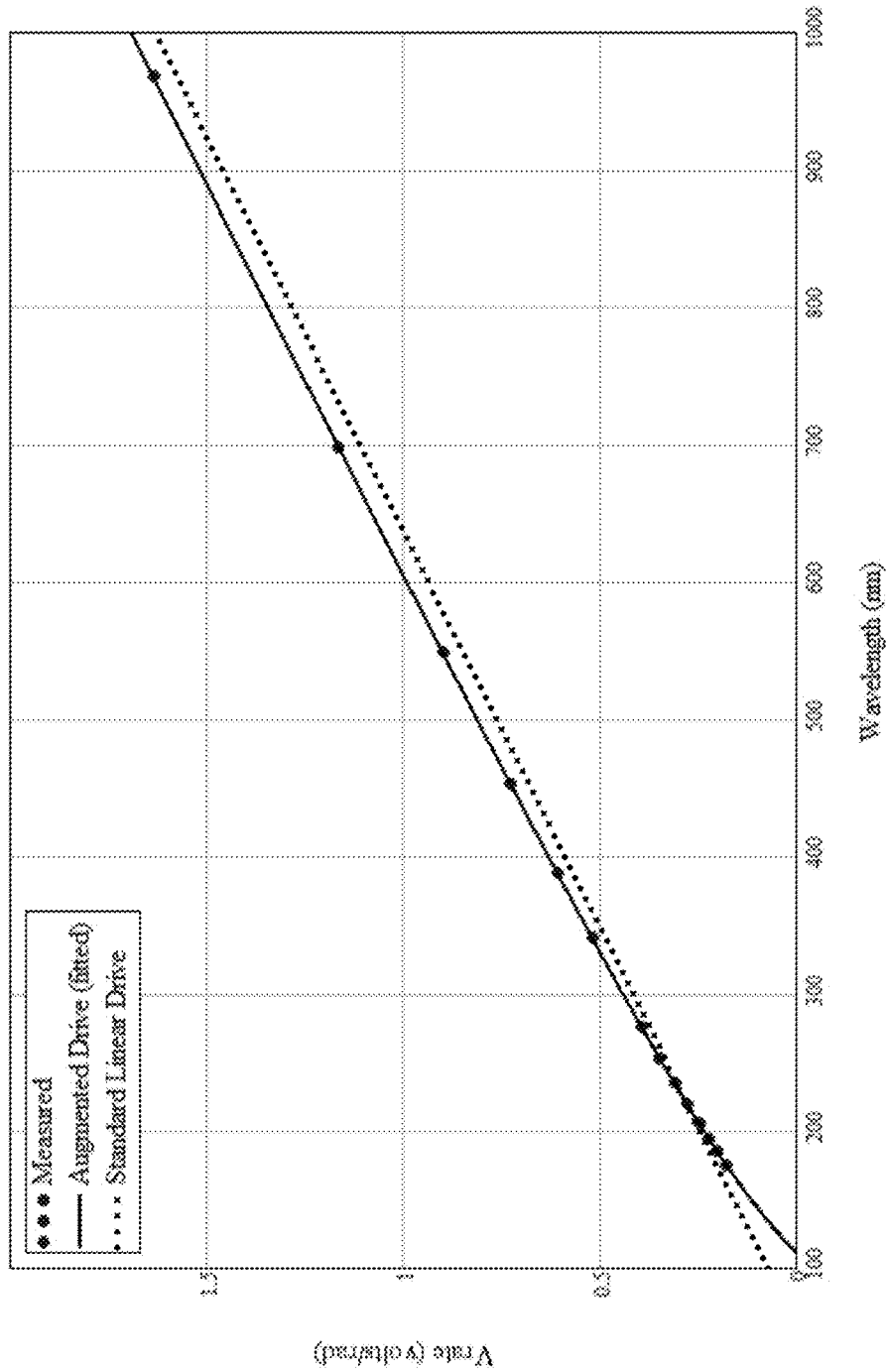
FIG. 14 shows standard linear drive and augmented fit to Vrate parameters (octagonal format PEM, "PEM B")

The resulting augmented drive curve is plotted in FIG. 14, overlaid with the standard linear drive curve. The result here is somewhat different to that observed for PEM A in that the linear drive does not pass closely through the $V_{rate}$ values in the visible and NIR, although the slope of the line seems to be approximately correct in this region. There are two possible explanations for this:

1. The PEM was miss-calibrated in the factory
2. The calibration was optimized to be a closer fit in the UV part of the spectrum The first of these two possibilities seems the most likely. Either way, the augmented drive is clearly a much better fit to the true $V_{rate}$ values, as was observed for PEM A.

Figure 15:
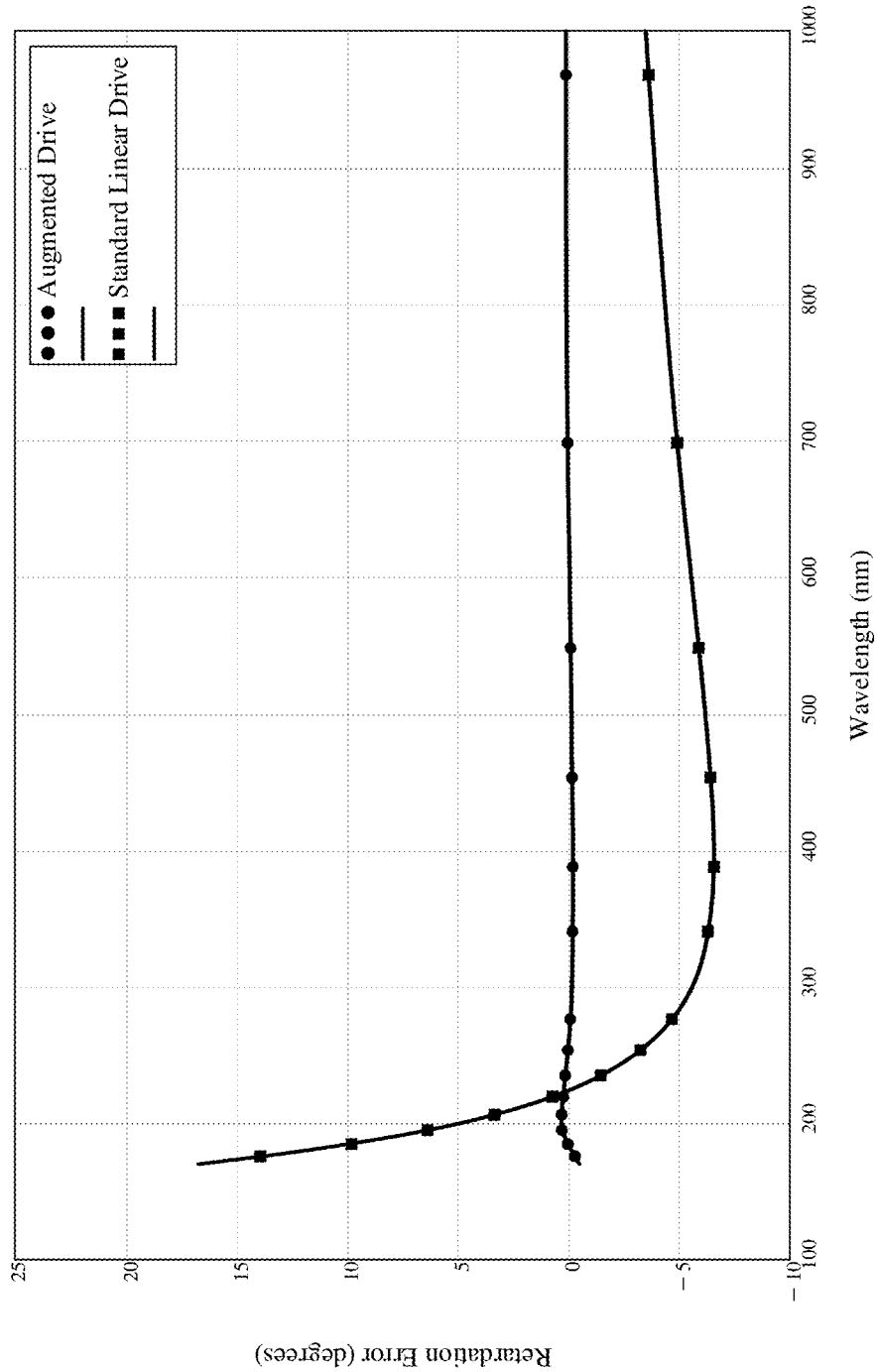
FIG. 15 shows retardation residuals of standard linear drive and augmented fit (octagonal format PEM, "PEM B").

The corresponding retardation errors are shown in FIG. 15, where for the linear drive, the different offset has had the effect of reducing the retardation error in the UV (as compared to PEM A above) at the expense of an increase in the Vis-NIR errors. The augmented drive has, again, a largely flat retardation error curve lying comfortably within ±1° (<1% relative).

Figure 16:
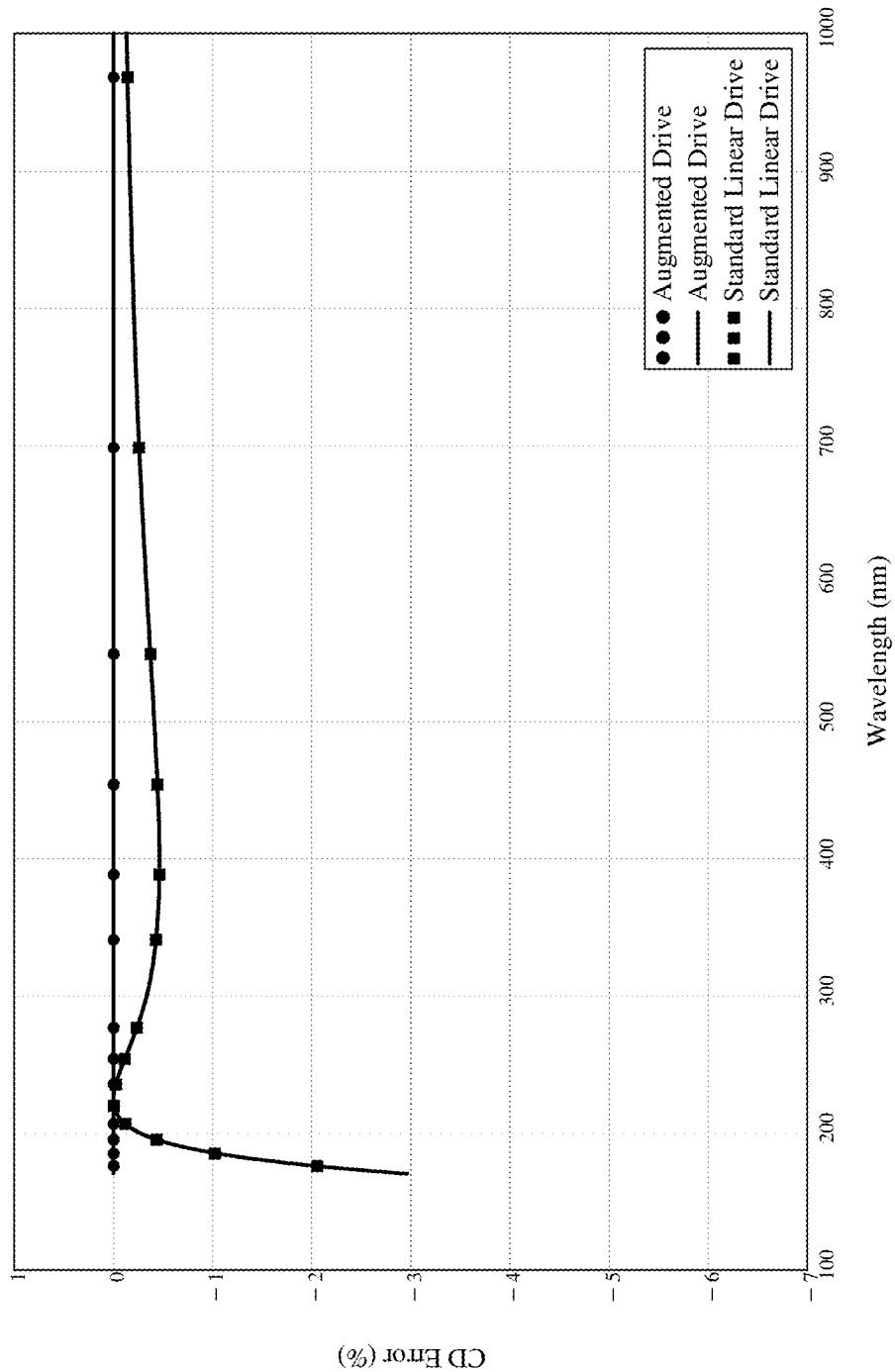
FIG. 16 shows CD errors of standard linear drive and augmented fit (octagonal format PEM, "PEM B").
Figure 17:
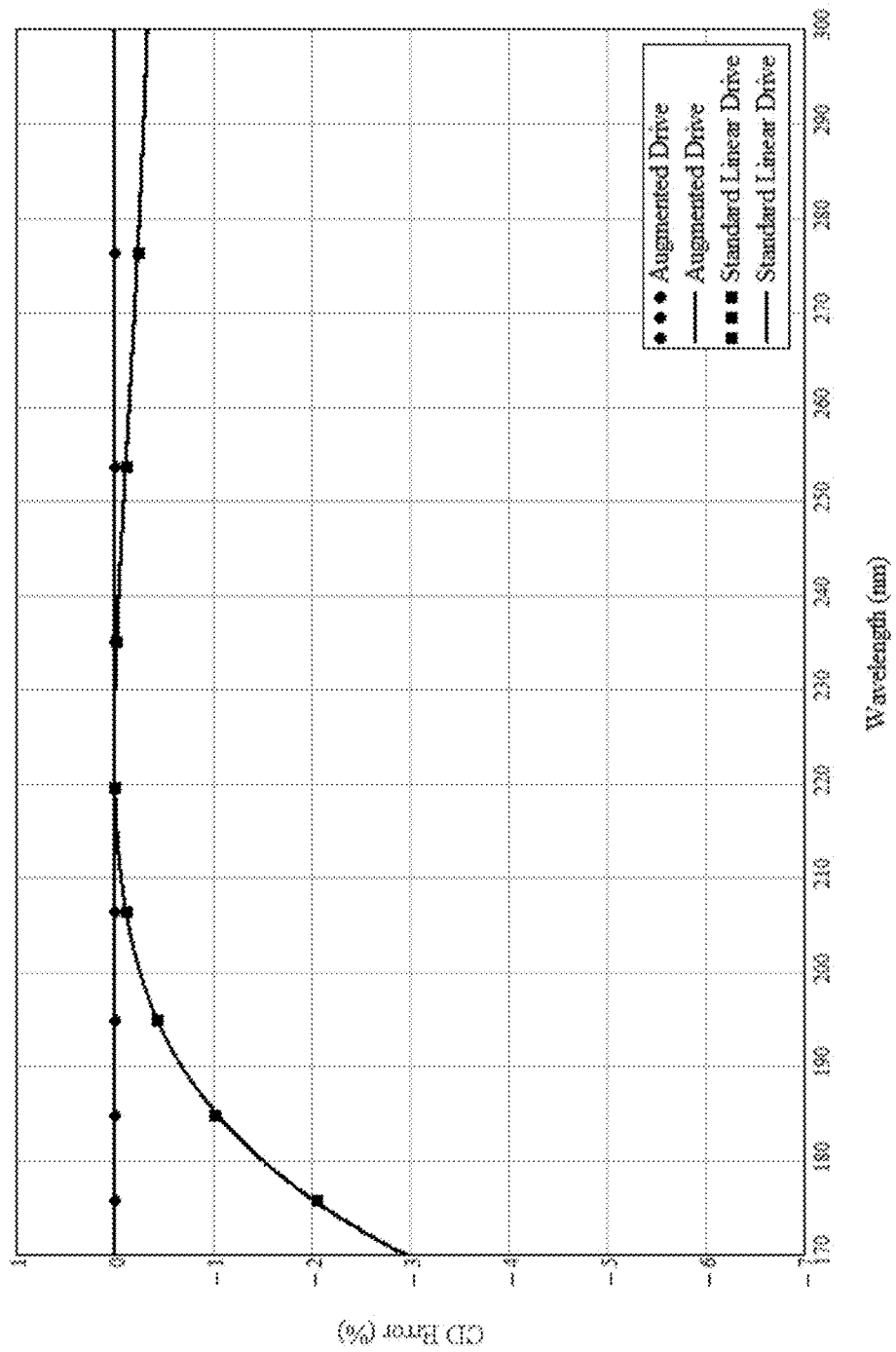
FIG. 17 shows CD errors of standard linear drive and augmented fit in the UV region (octagonal format PEM, "PEM B").

The resulting CD measurement errors for the two drives are shown in FIG. 16 and FIG. 17. As before, the errors for the augmented drive are effectively zero. For the linear drive the error is approximately −1.5% at 180 nm and −3.0% at 170 nm. In the visible the error peaks at about ~0.46% near 400 nm.

Experimental Verification of CD Errors with Linear Drive

Figure 18:
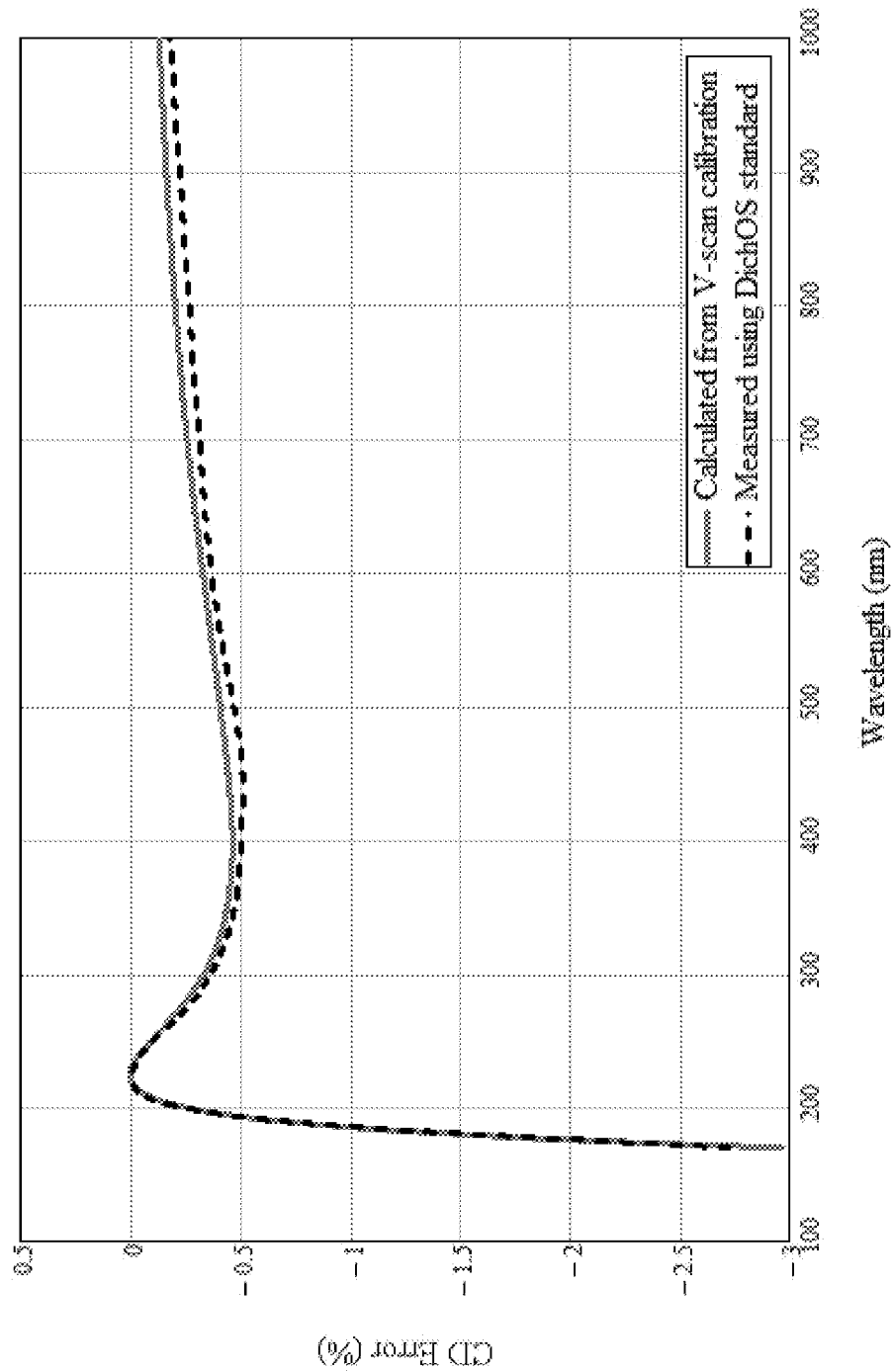
FIG. 18 shows CD error of the standard linear drive as calculated from V-scans, compared with measurements using the DichOS optical standard.

Next, an experiment was conducted to verify that the calculations presented above give a good representation of the CD errors resulting from using the standard linear PEM drive instead of the fitted augmented drive. Using PEM B (octagonal format) and DichOS (International Application No. PCT/US2015/054151, incorporated by reference in its entirety herein) calibrations were performed with the PEM driven using the standard linear drive and the fitted augmented drive. The ratio of the resulting C1 DichOS curves (minus 1) in theory then gives the relative CD error for the linear drive. This is plotted in FIG. 18, overlaid with the calculated results from FIG. 16. The correspondence is excellent, particularly in the UV. This provides further evidence of the inaccuracies inherent in the standard linear PEM drive and confirms that the error calculations presented above correctly represent the magnitudes of these errors.

Conclusion

The augmented PEM drive function has been demonstrated to be superior to the standard linear drive with respect to retardation accuracy. This improvement essentially eliminates all PEM related errors in CD measurements.

The inaccuracy of the standard linear drive has been shown to induce CD errors of up to −5% at 170 nm and −3% at 180 nm. Furthermore, the factory calibration of the two PEMs tested in this study was found to be significantly different, further highlighting the need for individual calibration PEMs to the augmented drive function using the V-scan calibration method. The DichOS standard (International Application No. PCT/US2015/054151, incorporated by reference in its entirety herein) provides the ideal sample for performing these V-scan calibrations, having multiple, high magnitude peaks across the wavelength range, with low transmittance giving access into the critical VUV region where the linear drive has been demonstrated to have the greatest inaccuracy.

Example 4. Photoelastic Modulator Retardation Stabilization

In instruments utilising a photoelastic modulator (PEM), an important consideration for the stability and accuracy of measurements performed is that the PEM produces a consistent retardation with minimal temporal and temperature dependent drift. Methods of compensating for temperature dependence electronically have not, to our knowledge, been described in the art. The present application reports the development of PEM driver electronics which allow the resonance frequency to be precisely measured in real time. In consequence, the present invention is able to utilise the PEM frequency as part of a 2 separate and independent retardation stabilisation schemes; both of which we consider to be a novel and versatile approach to the problem.

Figure 19:
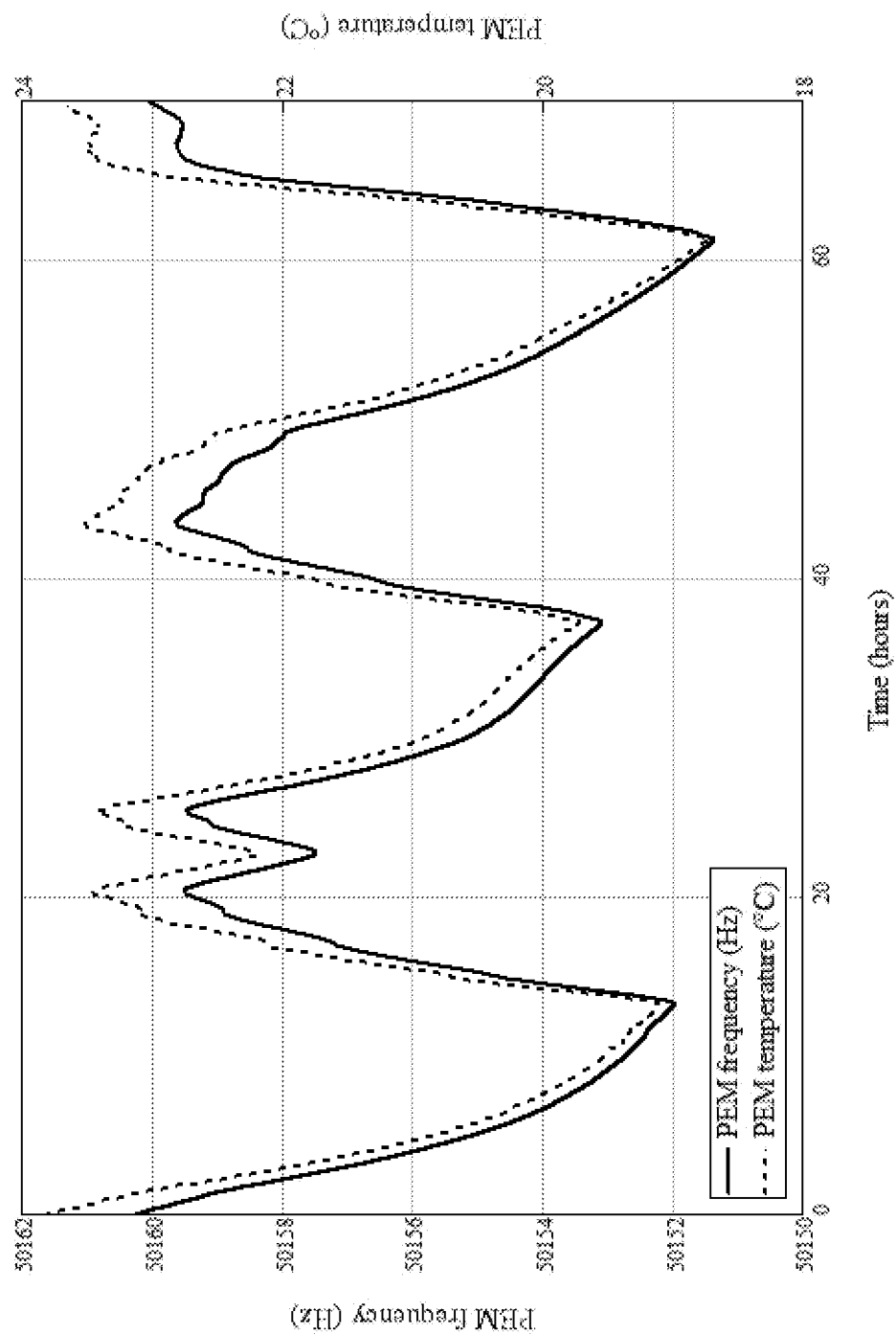
FIG. 19 shows a trace of PEM frequency overlaid with PEM temperature, "PEM B".
Figure 20:
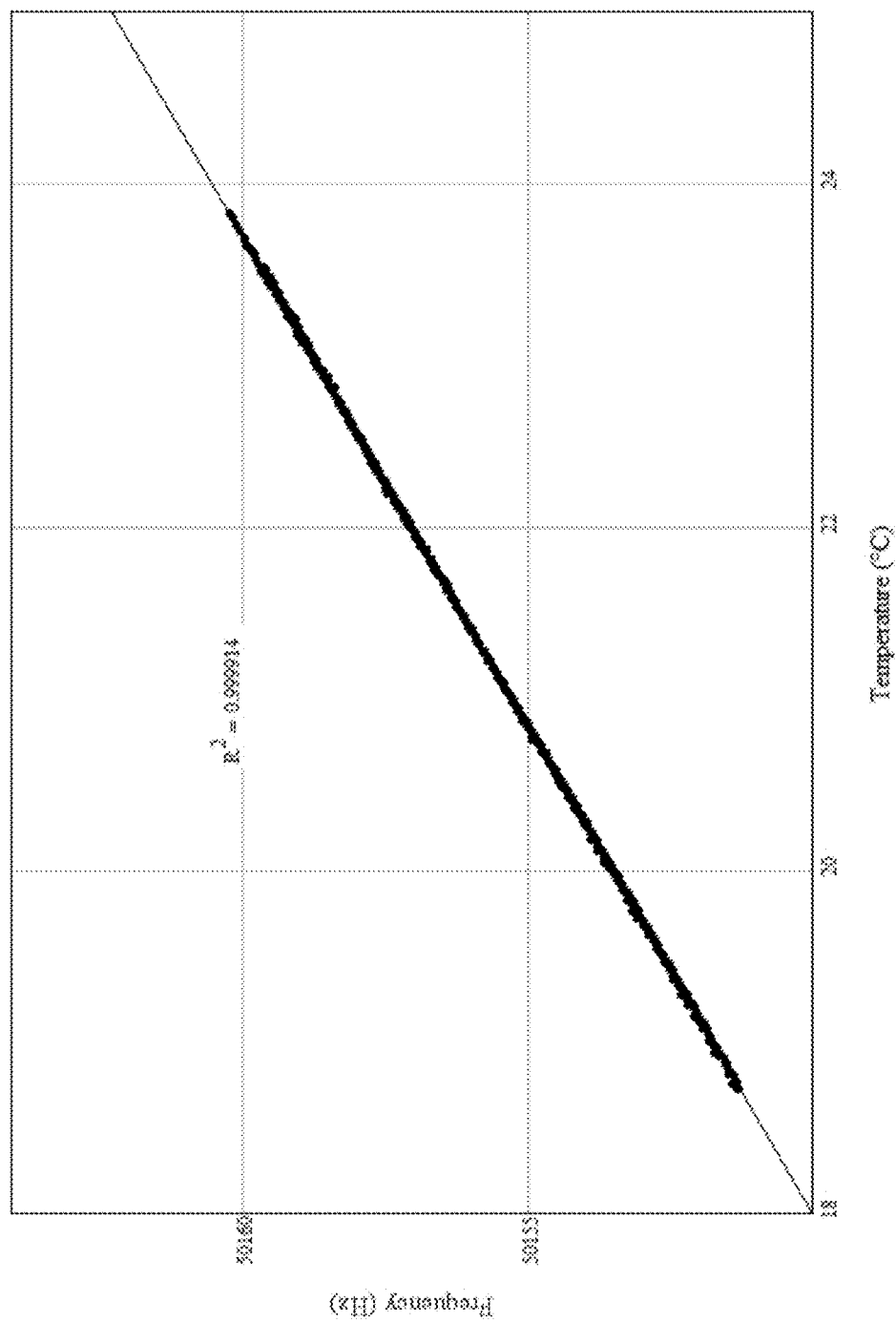
FIG. 20 shows a correlation of PEM frequency with temperature, "PEM B".

During the course of a number of PEM retardation stability experiments, the PEM resonance frequency was logged together with CD V-scans (at two wavelengths) and PEM temperature readings. FIG. 19 shows a plot of PEM frequency overlaid with temperature for one of the experiments which lasted for a total of three days, with the ambient temperature varying over a range of approximately 18.5° C. to 23.5° C. during this period. There is clearly a very strong correlation between PEM temperature and frequency. By plotting frequency directly against temperature (FIG. 20) it can be seen that the correlation is highly linear. It was found that by time shifting the temperature data forward by approximately 5 minutes (as has been done in FIG. 20), a small amount of hysteresis present in the un-shifted plot was eliminated. It can therefore be concluded that the PEM core temperature equilibrates to the temperature of the PEM outer housing (where the temperature probe was located) in approximately 5 minutes.

An excellent linear correlation between temperature and frequency was found for a number of PEMS (designated PEM A to PEM E) tested during a series of retardation stability experiments. We may model this relationship for a given PEM as follows:

$$f = f_{T_0} + m \cdot T \qquad (58)$$

Where $f_{T_0}$ is the PEM frequency at 0° C. and m is the slope in Hz/° C. The data from each experiment was fitted to this linear equation to yield the parameters $f_{T_0}$ and m. The parameters corresponding to several different PEMs tested are shown in Table 6 below. Here it can be seen that the slope values m are similar for all the PEMs tested, with the exception of PEM A which was of a different design to the others (octagonal optical element rather than rectangular).

TABLE 6 f vs. T linear fit parameters

| PEM core | m (Hz/° C.) | $f_{TO}$ (Hz) |
|---|---|---|
| PEM A | 2.325 | 50041.96 |
| PEM B | 1.7744 | 50065.07 |
| PEM C | 1.7325 | 50119.34 |
| PEM D | 1.6683 | 50113.43 |
| PEM E | 1.6381 | |

Retardation Stability

Figure 21:
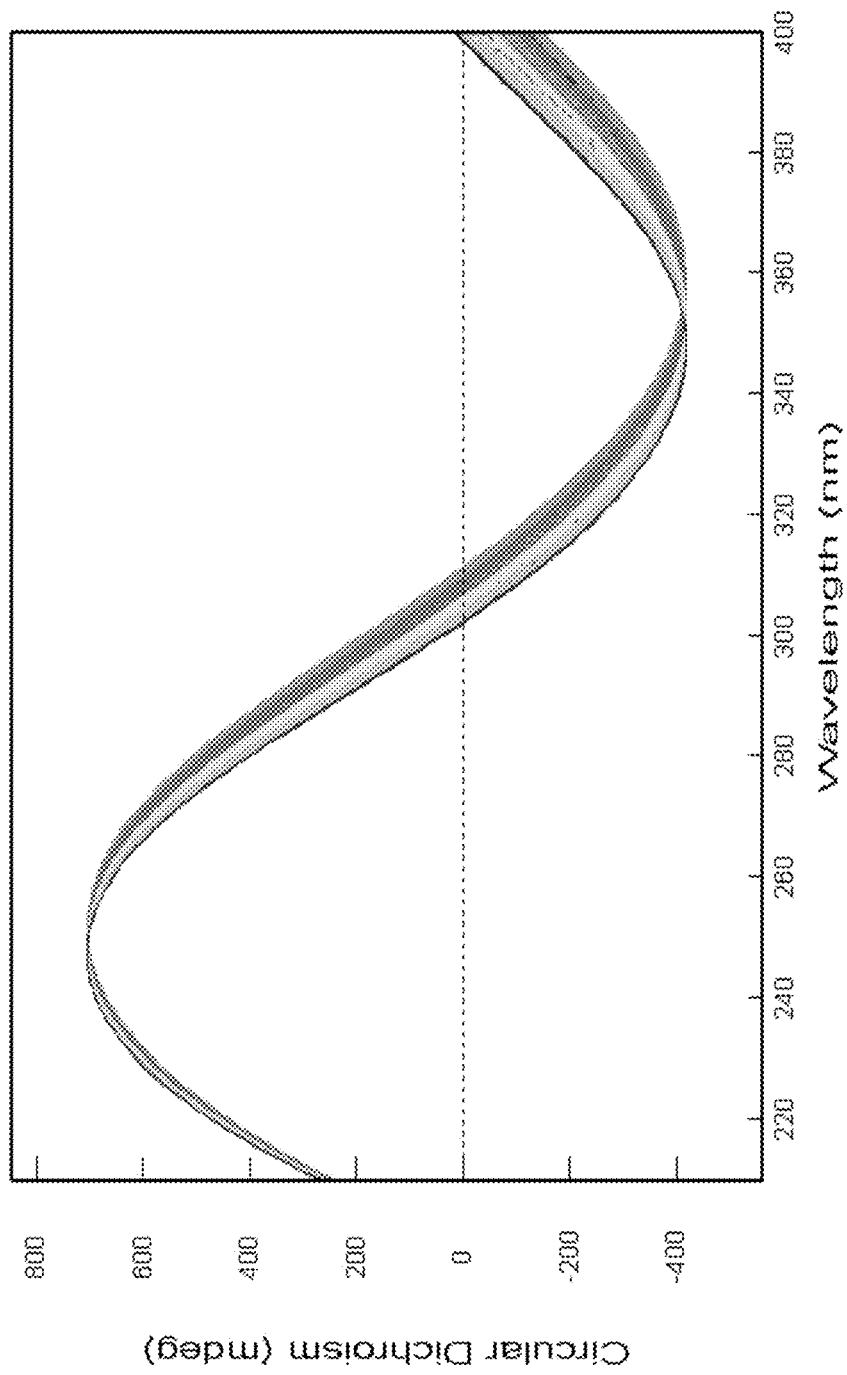
FIG. 21 shows V-scans, PEM B, 583 nm, no retardation correction.

An example set of V-scan (583 nm) runs collected during a retardation stability experiment is shown FIG. 21. Over the course of this experiment, the ambient temperature varied between approximately 19° C. to 25.5° C. The fact that the V-scans do not overlay indicates that the retardation Φ for a given control voltage $V_{in}$ is not staying constant with temperature. Note that the X-axis in 25 is plotted as wavelength but actually corresponds voltage $V_{in}$, (400 nm=4V, 200 nm=0V), the wavelength being fixed at 583 nm.

The V-scan data from each retardation run may be analysed via the method described in Example 1, by fitting of modified Bessel functions. This provides the parameter $V_{rate}$, corresponding to volts per radian of retardation at the V-scan wavelength in question. An increase in $V_{rate}$ indicates a drop in efficiency (since a higher voltage is required to produce 1 radian of retardation). Similarly a drop in $V_{rate}$ signifies an increase in efficiency.

We may arbitrarily designate an ambient temperature (T=$T_{nom}$) corresponding to ($V_{rate}=V_{ratenam}$)$^{at}$ which the PEM drive correction is assigned the value 1. For these experiments, a value of 21° C. was chosen for $T_{nom}$. This in turn corresponds to a particular resonance frequency $f_{nom}$. We may then define the frequency shift Δf as:

$$\Delta f = f - f_{nom} \qquad (59)$$

We define Dcorr (the drive correction) as follows:

$$Dcorr = \frac{V_{rate}}{V_{ratenom}} \qquad (60)$$

is a scaling factor which multiplies the PEM control voltage $V_{in}$ so as to maintain a constant retardation as the temperature changes. This gives a corrected control voltage $V_{in\_corr}$:

$$V_{in\_corr} = V_{in} \cdot Dcorr \qquad (61)$$

Retardation Stability Measurements: PEM B

Figure 22:
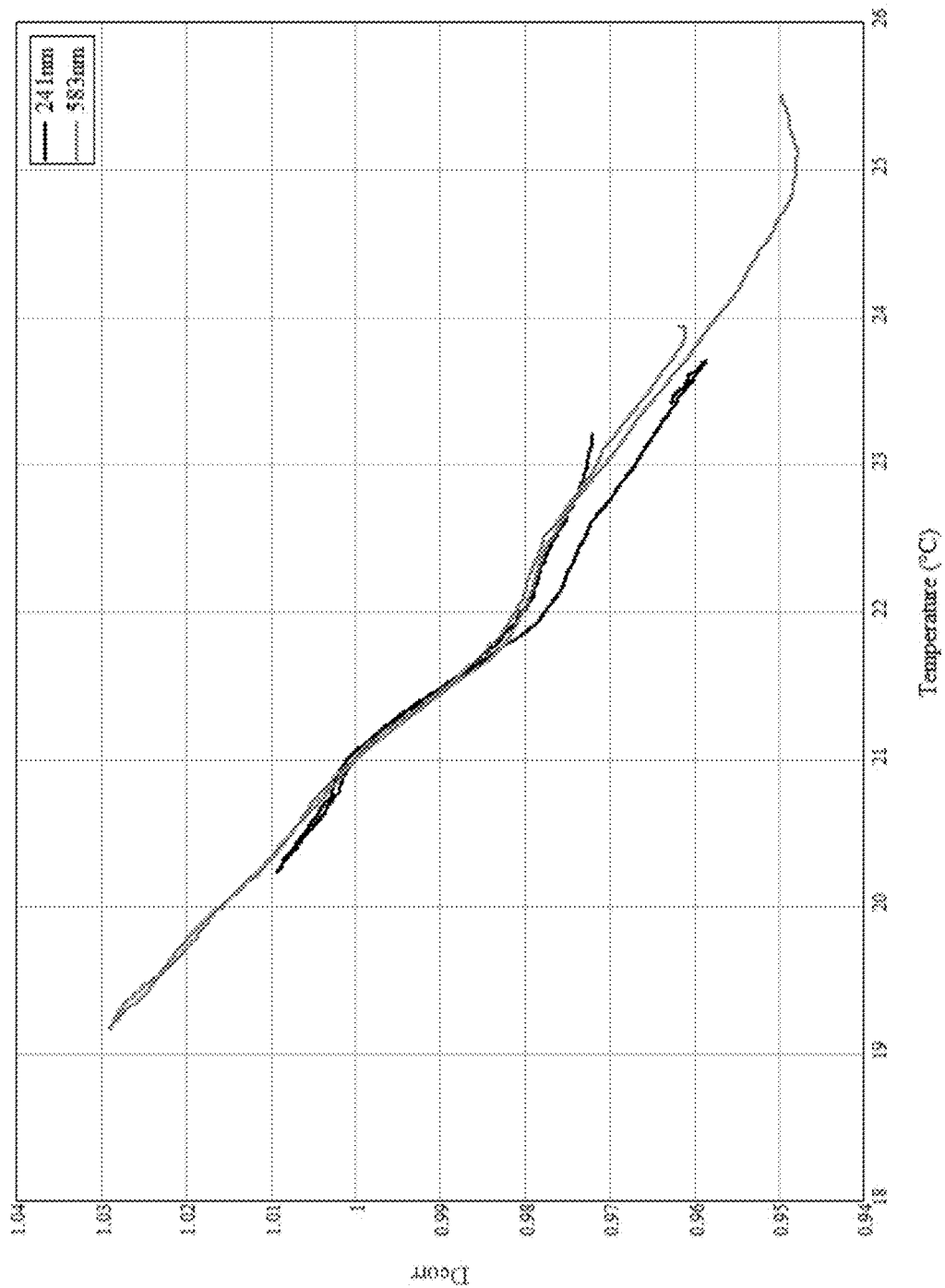
FIG. 22 shows Dcorr vs. temperature curves, "PEM B", no retardation correction.

The Dcorr curves vs. temperature are plotted in FIG. 22 for experiments involving PEM B. Experiments were conducted at two wavelengths: 241 nm and 583 nm. Examining FIG. 22, the following observations can be made:

Dcorr reduces with increasing temperature in an approximately linear fashion.

Consequently, the efficiency of the PEM must be increasing with increasing temperature.

The curves are similar for 241 nm and 583 nm, indicating that the effect is not strongly wavelength dependent.

The curves do not retrace exactly on rising and falling regions of the temperature cycle. This may indicate hysteresis or permanent ageing effects.

Retardation Correction: PEM B

Figure 23:
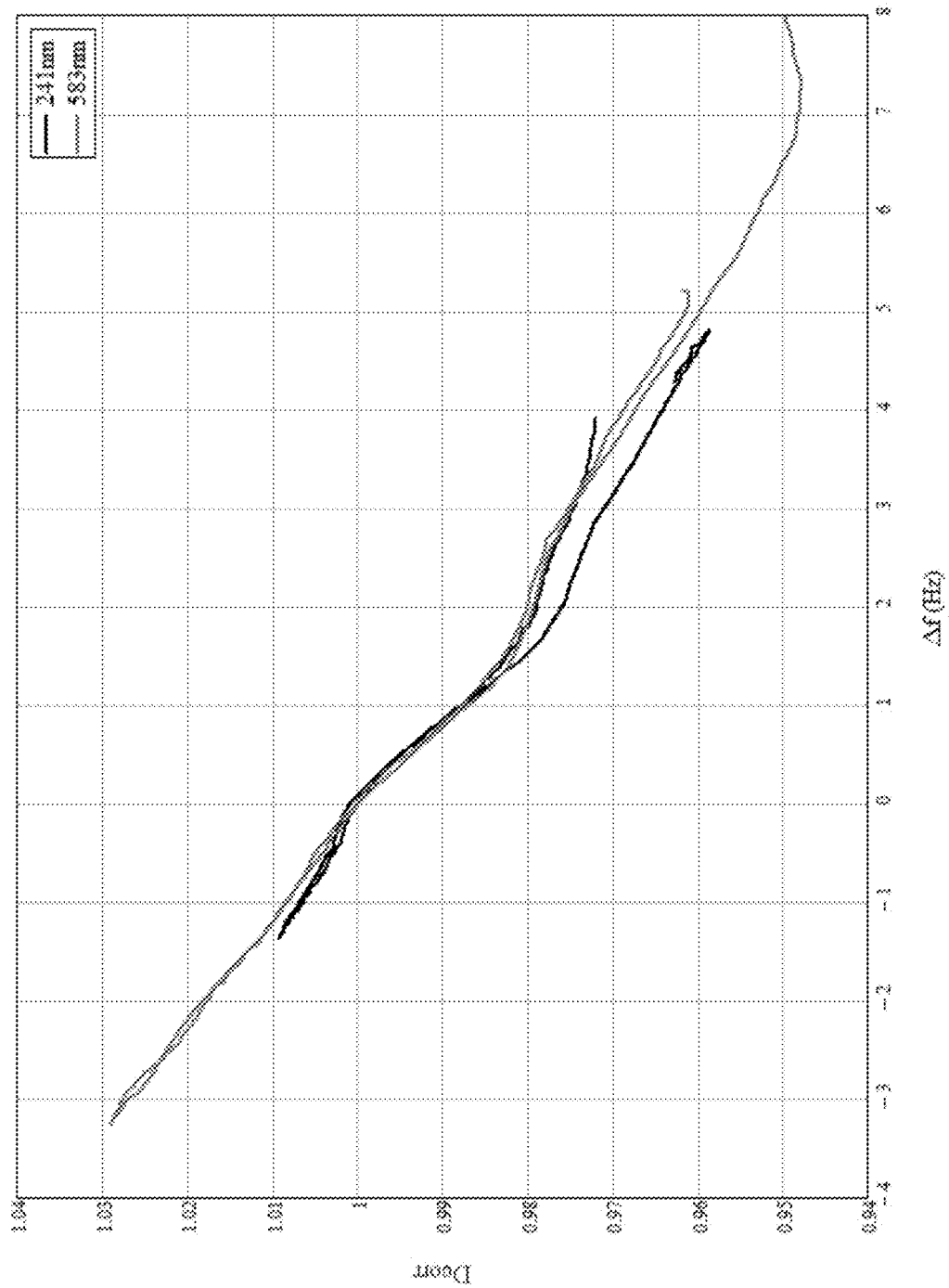
FIG. 23 shows Dcorr vs. PEM frequency shift (Δf) curves, "PEM B", no retardation correction.

The abscissa in FIG. 22 may be converted to Δf using the slope value in Table 6. This allows Dcorr to be plotted against Δf, as shown in FIG. 23. Then fitting straight lines through the two datasets, the following linear approximations for Dcorr were determined:

241 nm: Dcorr=1−0.0096 Δf 583 nm: Dcorr=1−0.0086 Δf

Figure 24:
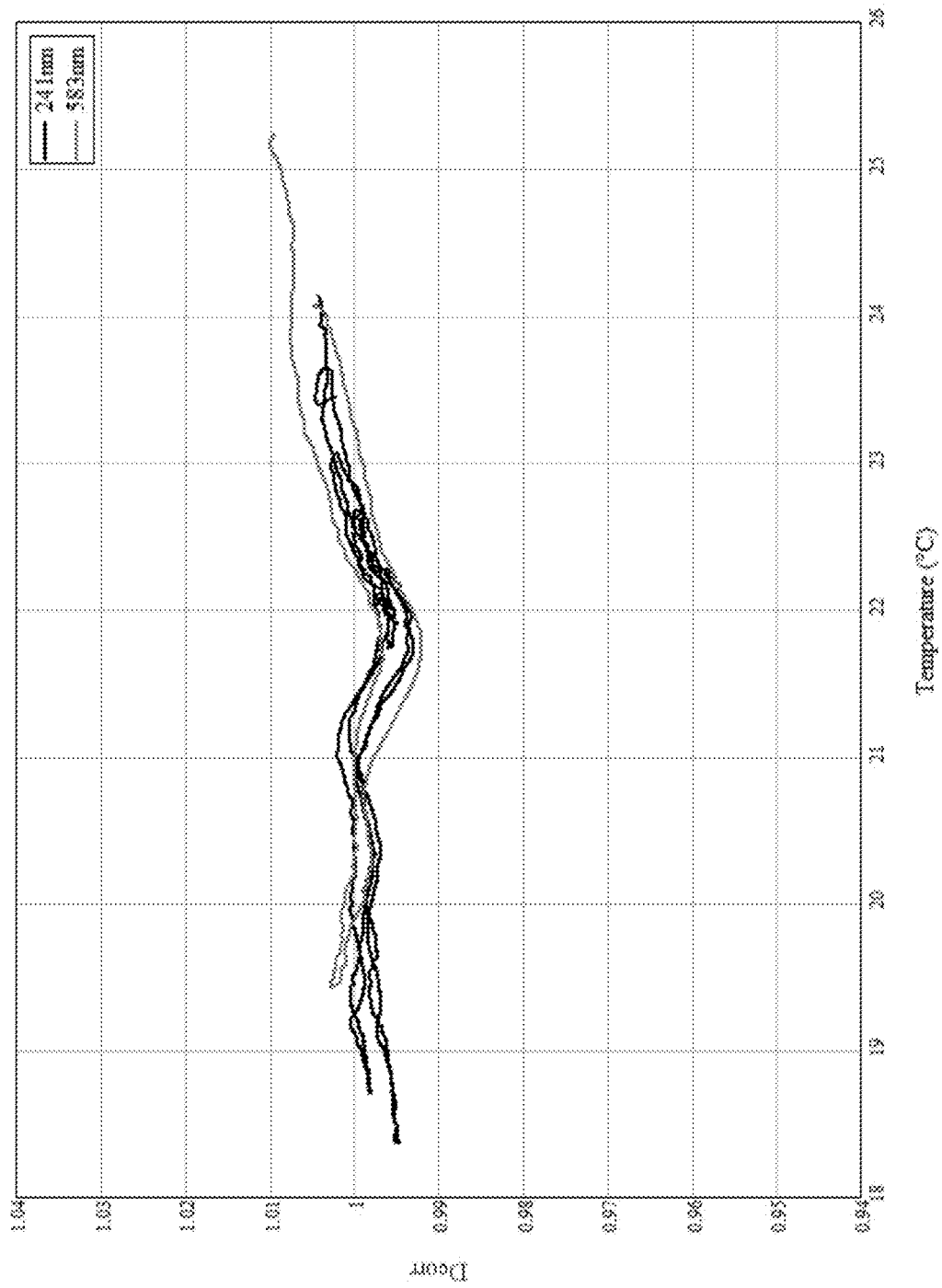
FIG. 24 shows Dcorr vs. temperature curves, "PEM B", with retardation correction.

This indicates that the PEM drive level has to be reduced by just under 1% for each 1 Hz increase in resonance frequency (and vice versa). The functions above were incorporated into the PEM driver firmware. The retardation experiments were then repeated with the retardation correction feature switched on. The resulting DCorr vs. temperature curves are also shown in FIG. 24. The following observations may be made:

For both wavelengths tested the retardation drift has been reduced significantly using retardation correction. The curves now lie comfortably within a ±1% band over a comparatively wide temperature range of 18.5° C. to 25° C.

The 'bumps' in the original uncorrected curves remain present in the corrected curves (near 21.5° C.)

From the slight upward slope of the corrected curves, it appears that the retardation may have been slightly overcorrected.

The hysteresis/ageing effects remain in the corrected data. A gradual drift in retardation over an extend period of time may be expected (involving numerous temperature cycles).

Figure 25:
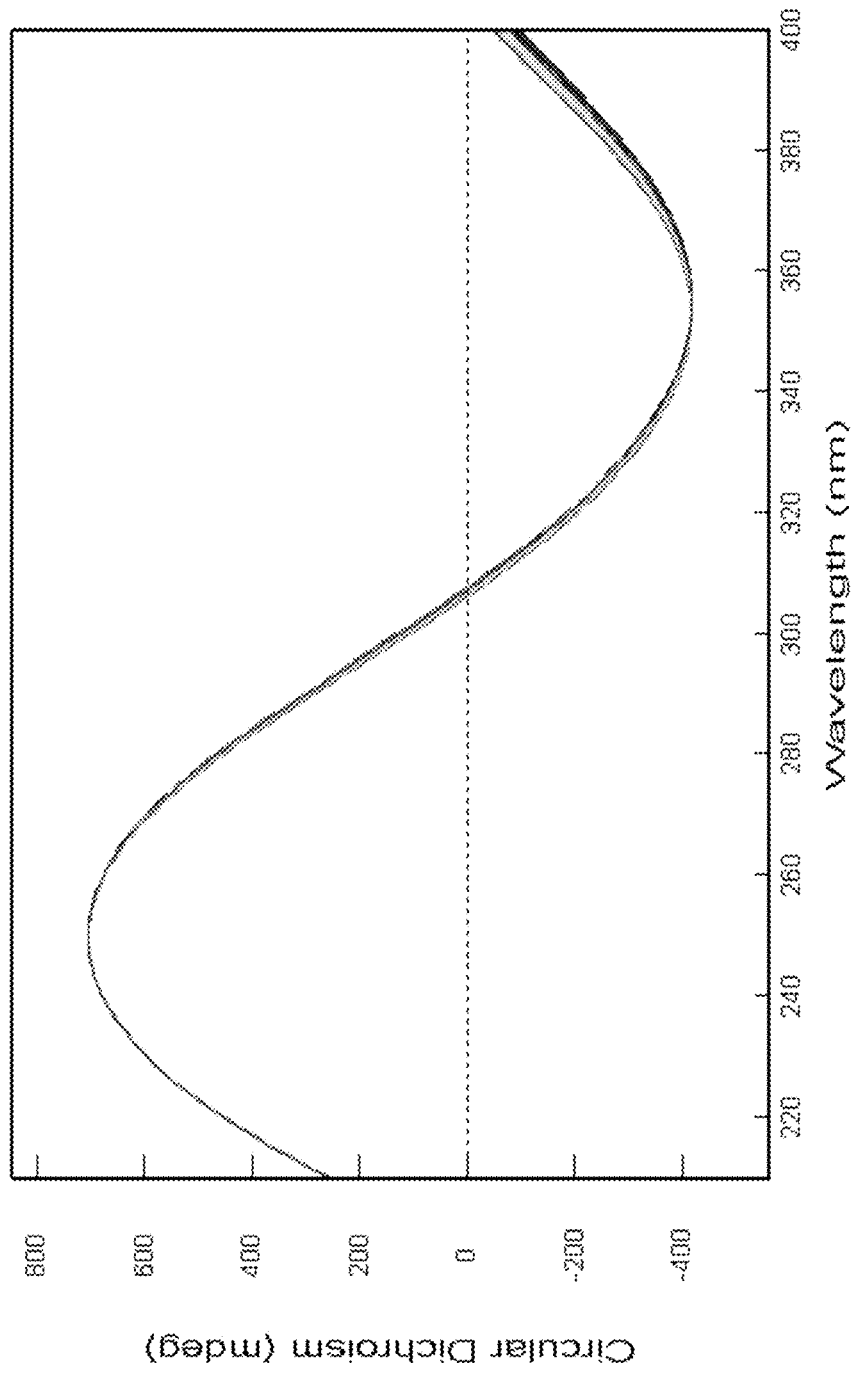
FIG. 25 shows V-scans, "PEM B", 583 nm, with retardation correction.

The plot in FIG. 25 shows the V-scan dataset for one of the retardation experiments (583 nm) in which retardation correction was used. By comparing with FIG. 21, the improvement in retardation stability is very evident. Of particular importance is the first peak of the curve which corresponds to the retardation used for CD experiments (1.841 radians). With retardation correction switched on, this point is stable in magnitude (FIG. 25), while without retardation correction this point is unstable in magnitude (FIG. 21). This would in practise result in varying measured CD magnitudes as the temperature changed. The effectiveness of the frequency based retardation correction has thus been demonstrated.

Example 5. Frequency Stabilisation of the PEM Core Using Temperature Control Another approach to solve the problem of PEM retardation change with temperature is to stabilise the temperature of the PEM core. The PEM core temperature is difficult to measure directly, as contact temperature probes will detrimentally effect the PEM operation and infrared optical probes can interfere in other optical measurements. Frequency is a good direct probe of temperature of the PEM core, and can therefore be used to monitor changes in PEM core temperature once the frequency and temperature response has been calibrated (Table 5). This frequency derived temperature can be used as the controlling measured variable for input to a proportional integral derivative (PID) control loop driving heating or cooling of the PEM core environment.

A PID control loop using the equation below is used to set a variable voltage output at regular intervals using the value μ(t) derived from the error term e(t). This is used to heat or cool a Peltier effect cooling and heating device directly attached to the PEM casing. The PEM casing is cooled and heated to stabilise the PEM core temperature. $K_p$, Ki and Kd are tuned to provide a responsive and stable temperature controlled PEM core. The error term e(t) is simply the difference between the measured PEM core temperature based on the frequency minus the target temperature for the PEM core.

$$u(t) = K_p e(t) + K_i \int_0^t e(\tau) + K_d \frac{de(t)}{dt} \quad (62)$$

The above feedback control scheme can stabilise the PEM core temperature very effectively under static retardation conditions. A significant proportion of instability of the PEM core is due to changes in self-heating of the core itself. As the PEM drive is increased to provide higher retardation, the heating generated by the PEM core itself will increase. A pure feedback loop like the PID is only able to respond to this once this change is registered as an increase in heat in the PEM core, and can only respond with a significant lag of several minutes through heating of the PEM environment.

As the PEM retardation and drive voltage are tracked by the drive electronics and software, changes in PEM retardation and drive voltage are known instantly. This information can be used to pre-emptively change the PEM case temperature and compensate for the oncoming change in PEM temperature. The difference $(e(t)_{ff})$ between the current PEM drive and the rolling average of the PEM drive acquired over a time period equal to the lag between changes in case temperature is used to evaluate the equation below. Deviations in the PEM drive from the rolling average are multiplied by the factor $K_{ff}$, which is tuned to provide the most stable PEM core temperature under varying PEM drive conditions and added to the PID control loop output μ(t) to provide the final output $μ(t)_{ff}$.

$$u(t)_{ff} = K_{ff} e(t)_{ff} + \mu(t) \quad (63)$$

Figure 26:
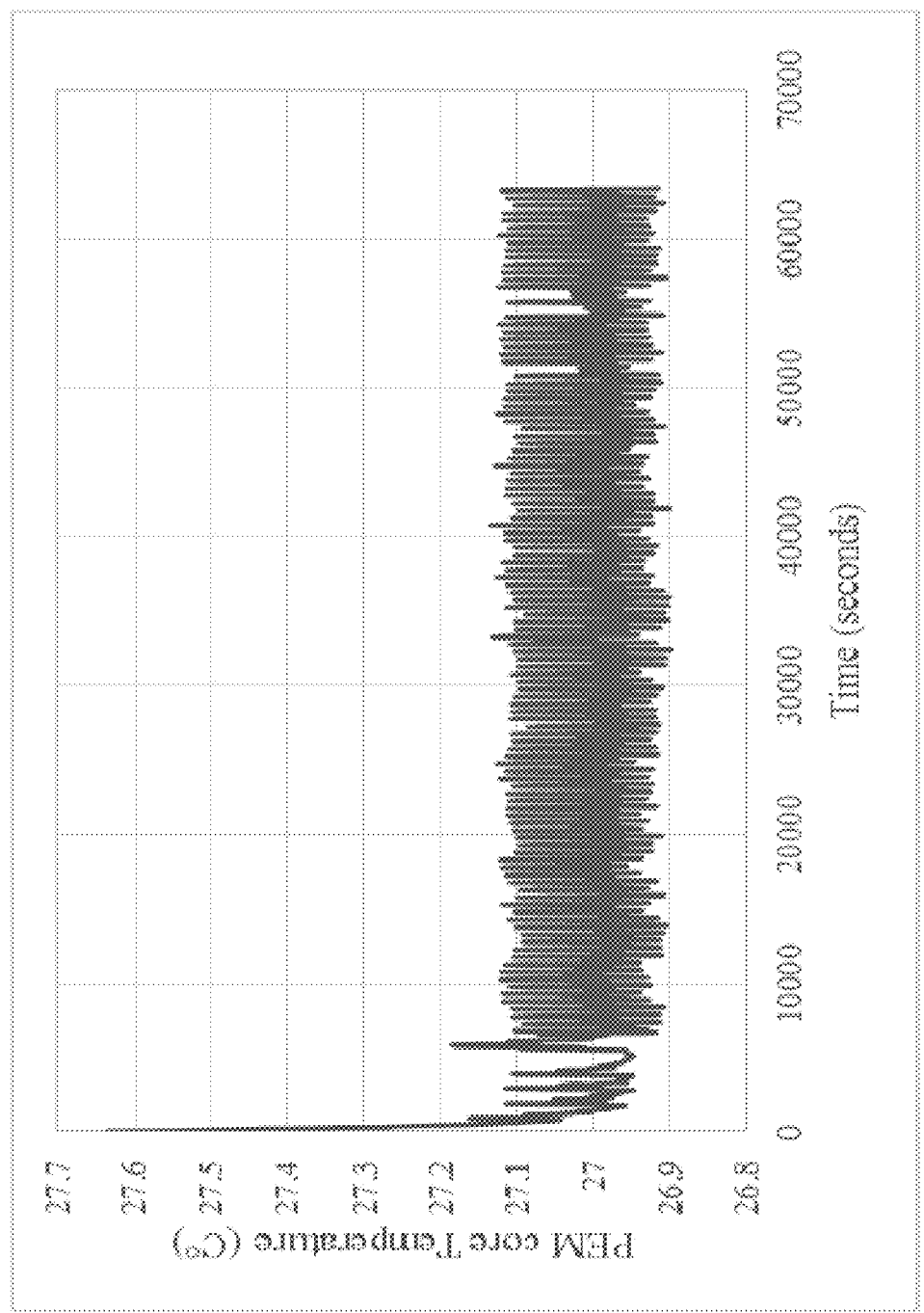
FIG. 26 shows a temperature control of a PEM core using frequency derived temperature input to a PID control system and feedforward temperature compensation for changes in PEM drive.

The above functions were incorporated into software. The PEM core temperature (derived from the frequency after calibration) and the PEM drive level were monitored at a frequency of approximately 2 hertz. Using the above functions, the output of a variable voltage supply was varied from −8 to 8 volts, causing a Peltier device in good thermal contact with the PEM casing to heat or cool the PEM. The PEM drive voltage was constantly varied between 0.19 and 2.6 volts, for a period of 17.6 hours, in which the ambient temperature varied 2.5 degrees Celsius. Plotting the frequency derived PEM core temperature against time (FIG. 26) shows an initial stabilisation period of approximately 30 minutes followed by consistent temperature stabilisation to within 0.3 degrees Celsius. From Table 5 and the results from PEM B previous, this corresponds to only a 0.55 Hz frequency change and significantly less than 1% error in PEM retardation.

Computer Program Product

It is to be understood that all of the methods described herein can be carried out in the electronics themselves, or on a host PC monitoring the system.

The PID control system as described supra was setup for prototyping with a PC program that monitored the control electronics and was used for controlling and an output via a separate variable output powersupply to the Peltier device. Using the PC was one way to carry out these experiments quickly. However, it is also understood that under other circumstances (i.e. for commercialization), this functionality would be incorporated into firmware of the control electronics with variable voltage output stage incorporated into the control electronics. As such, the PC software is just emulating what we would do for production, but was easier to prototype than adding the necessary functionality to the control electronics.

What is claimed is:

1. A method for calibrating a system comprising a photoelastic modulator (PEM) on a circular dichroism (CD) measurement instrument, the method comprising:

providing a circular dichroism (CD) sample;

scanning the control input voltage ($V_{in}$) at a fixed wavelength ($\lambda_{meas}$); and recording the CD scan of the sample, wherein the control input voltage ($V_{in}$) determines the peak retardation (δ) at the fixed wavelength ($\lambda_{meas}$), and wherein the method is repeated for two or more fixed wavelengths, wherein the method further comprises the step of fitting the results measured at each wavelength to a drive function (F).

2. The method of claim 1, wherein the drive function is an augmented drive function.

3. The method of claim 2, wherein the augmented drive function is characterized by the equation:

$$V_{in} = (c + m\lambda + n\lambda^{-1}) \cdot \frac{2}{\pi} \cdot \Phi,$$

wherein $V_{in}$ is the control input voltage, c is the intercept, m is slope, λ is wavelength.

4. The method of claim 2, wherein a CD measurement error for the augmented drive is about less than 0.01%.

5. The method of claim 1, wherein the fixed wavelength is selected from two or more wavelengths listed in Table 1

TABLE 1

| Peak No. | Peak Wavelength (nm) |
|---|---|
| 1 | 175.29 |
| 2 | 184.26 |
| 3 | 194.26 |
| 4 | 205.64 |
| 5 | 218.79 |
| 6 | 234.24 |
| 7 | 252.72 |
| 8 | 275.25 |
| 9 | 303.30 |
| 10 | 339.15 |
| 11 | 386.46 |
| 12 | 451.54 |
| 13 | 546.20 |
| 14 | 695.61 |
| 15 | 964.10 |
| 16 | 1577.53. |

6. The method of claim 5, wherein the fixed wavelength is selected from at least four wavelengths in Table 1.

7. The method of claim 5, wherein the fixed wavelength is selected from at least eight wavelengths in Table 1.

8. The method of claim 5, wherein the fixed wavelength consists of the 16 wavelengths in Table 1.

9. The method of claim 1, wherein the CD sample is a DichOS optical standard.

10. The method of claim 1, wherein conditions for recording the scans comprise:
   a) a bandwidth of about 1 nm to about 8 nm;
   b) a time per point of about 0.1 seconds to about 5 seconds; and
   c) about 50 to about 500 points.

11. The method of claim 1, further comprising a drive correction to account for temperature shifts, wherein the drive correction is characterized by the equation:

$$Dcorr = \frac{V_{rate}}{V_{ratenom}},$$

wherein $V_{rate}$, corresponds to the actual volts per radian of retardation at the V-scan wavelength, $V_{ratenom}$, corresponds to a nominal value for this parameter, and Dcorr is a function of the PEM resonance frequency shift ($\Delta f$).

12. The method of claim 11, wherein the control input voltage $V_{in}$ is scaled by the drive correction to give a corrected control voltage $V_{in,corr}$ characterized by the equation:

$$V_{in,corr} = V_{in} \cdot Dcorr.$$

13. The method of claim 1, wherein the system transmits light through the sample to measure its optical properties and the system includes a sample stage that carries the sample and has an aperture through which light is transmitted for each calibration of the system.

14. The method of claim 1, wherein the system reflects light from the sample to measure its optical properties and the system includes a sample stage that carries the sample and also carries a mirror from which light is reflected for each calibration of the system.

15. The method of claim 1, further comprising a temperature control system.

16. The method of claim 15, wherein the temperature control system is used to stabilize the temperature of the PEM core.

17. The method of claim 16, wherein the temperature control system is a proportional integral derivative (PID) control system.

18. A calibration system comprising a photoelastic modulator (PEM) on a circular dichroism (CD) measurement instrument, wherein the calibration system is configured to for calibrating the PEM on the CD measurement instrument, and a device or program for collecting data, wherein the calibration system comprises a mechanism for scanning the control input voltage ($V_{in}$) at a fixed wavelength ($\lambda_{meas}$), wherein the fixed wavelength is selected from two or more wavelengths listed in Table 1

| Peak No. | Peak Wavelength (nm) |
|---|---|
| 1 | 175.29 |
| 2 | 184.26 |
| 3 | 194.26 |
| 4 | 205.64 |
| 5 | 218.79 |
| 6 | 234.24 |
| 7 | 252.72 |
| 8 | 275.25 |
| 9 | 303.30 |
| 10 | 339.15 |
| 11 | 386.46 |
| 12 | 451.54 |
| 13 | 546.20 |
| 14 | 695.61 |
| 15 | 964.10 |
| 16 | 1577.53; | and an analyzer for recording the CD scan, wherein the control input voltage $V_{in}$ determines the peak retardation ($\delta$) at the fixed wavelength ($\lambda_{meas}$).

19. A method for calibrating a system comprising a photoelastic modulator (PEM) on a circular dichroism (CD) measurement instrument, the method comprising:

providing a circular dichroism (CD) sample;

scanning the control input voltage ($V_{in}$) at a fixed wavelength ($\lambda_{meas}$); and recording the CD scan of the sample, wherein the control input voltage ($V_{in}$) determines the peak retardation ($\delta$) at the fixed wavelength ($\lambda_{meas}$) and wherein the method is repeated for the 16 fixed wavelengths in Table 1

TABLE 1

| Peak No. | Peak Wavelength (nm) |
|---|---|
| 1 | 175.29 |
| 2 | 184.26 |
| 3 | 194.26 |
| 4 | 205.64 |
| 5 | 218.79 |
| 6 | 234.24 |
| 7 | 252.72 |
| 8 | 275.25 |
| 9 | 303.30 |
| 10 | 339.15 |
| 11 | 386.46 |
| 12 | 451.54 |
| 13 | 546.20 |
| 14 | 695.61 |

TABLE 1-continued

| Peak No. | Peak Wavelength (nm) |
|---|---|
| 15 | 964.10 |
| 16 | 1577.53. |

20. The method of claim 19, further comprising the step of fitting the results measured at each wavelength to a drive function (F).